US012563178B2

(12) United States Patent
Cao

(10) Patent No.: US 12,563,178 B2
(45) Date of Patent: Feb. 24, 2026

(54) CODING AND DECODING METHODS AND APPARATUSES

(71) Applicant: HANGZHOU HIKVISION DIGITAL TECHNOLOGY CO., LTD., Zhejiang (CN)

(72) Inventor: Xiaoqiang Cao, Zhejiang (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 73 days.

(21) Appl. No.: 17/928,446

(22) PCT Filed: Jun. 2, 2021

(86) PCT No.: PCT/CN2021/098009
§ 371 (c)(1),
(2) Date: Nov. 29, 2022

(87) PCT Pub. No.: WO2021/244586
PCT Pub. Date: Dec. 9, 2021

(65) Prior Publication Data
US 2023/0319259 A1     Oct. 5, 2023

(30) Foreign Application Priority Data

Jun. 5, 2020    (CN) .......................... 202010508168.9

(51) Int. Cl.
H04N 19/00        (2014.01)
H04N 19/105       (2014.01)
H04N 19/176       (2014.01)

(52) U.S. Cl.
CPC ......... *H04N 19/105* (2014.11); *H04N 19/176* (2014.11)

(58) Field of Classification Search
CPC ....................................................... H04N 19/00
See application file for complete search history.

(56) References Cited

U.S. PATENT DOCUMENTS 9,426,466 B2     8/2016  Van Der Auwera et al.
2013/0114730 A1  5/2013  Joshi et al.
(Continued)

FOREIGN PATENT DOCUMENTS

CN        104378637 A     2/2015
CN        104471935 A     3/2015
(Continued)

OTHER PUBLICATIONS

International Search Report for PCT/CN2021/098009 mailed on Aug. 24, 2021and its English translation provided by WIPO.
(Continued)

*Primary Examiner* — Maryam A Nasri
(74) *Attorney, Agent, or Firm* — Fish & Richardson P.C.

(57)                 ABSTRACT

Coding and decoding methods and apparatuses are provided. A decoding method includes: determining a prediction mode of a current block; when it is determined that the prediction mode of the current block satisfies one of the following conditions, determining the current block satisfies transform skip mode conditions: the prediction mode of the current block is an inter prediction mode; and the prediction mode of the current block is a direct mode.

6 Claims, 8 Drawing Sheets

(56) References Cited

U.S. PATENT DOCUMENTS

| | | | |
|---|---|---|---|
| 2013/0343464 A1 | 12/2013 | Van Der Auwera et al. | |
| 2014/0226721 A1 | 8/2014 | Joshi et al. | |
| 2015/0131739 A1 | 5/2015 | Lee et al. | |
| 2015/0139308 A1 | 5/2015 | Lee et al. | |
| 2017/0064328 A1 | 3/2017 | Na et al. | |
| 2017/0064336 A1 | 3/2017 | Zhang et al. | |
| 2018/0352226 A1 | 12/2018 | An et al. | |
| 2019/0349587 A1 | 11/2019 | Jang et al. | |
| 2020/0195923 A1 | 6/2020 | Miyagi et al. | |
| 2022/0248017 A1* | 8/2022 | Lim | H04N 19/176 |

FOREIGN PATENT DOCUMENTS

| | | |
|---|---|---|
| CN | 104509113 A | 4/2015 |
| CN | 107257475 A | 10/2017 |
| CN | 107566846 A | 1/2018 |
| CN | 107835414 A | 3/2018 |
| CN | 108293109 A | 7/2018 |
| CN | 108605123 A | 9/2018 |
| JP | 2017-169211 A | 9/2017 |
| JP | 2022-520408 A | 3/2022 |
| JP | 7467687 B2 | 4/2024 |
| WO | 2018/235405 A1 | 12/2018 |
| WO | 2019/135628 A1 | 7/2019 |

OTHER PUBLICATIONS

Written Opinion of the International Searching Authority for PCT/CN2021/098009 mailed on Aug. 24, 2021 and its English translation provided by Google Translate.

Chinese Office Action and Search Report for Application No. 202010508168.9, issued on Apr. 24, 2022 with English machine translation provided by applicant.

Japanese Patent Office Action, Office Action Issued in Application No. 2022-574826, Oct. 10, 2023, with Machine Translation.

Benjamin Bross et al., "Versatile Video Coding (Draft 8)", Joint Video Experts Team (JVET) of ITU-T SG 16 WP3 and ISO/IEC JTC 1/SC 29/WG 11, JVET-Q2001-vE, 17th Meeting: Brussels, BE, pp. 70-75,80-81, 157, 170, Jan. 7-17, 2020.

Ahn, Sangsoo et al, "A Novel Fast CU Encoding Scheme Based on Spatiotemporal Encoding Parameters for HEVC Inter Coding", IEEE Transactions on Circuits and Systems for Video Technology, vol. 25, No. 3, Mar. 2015.

Office Action in Japanese Appln. No. 2024-060323, mailed on Apr. 22, 2025, 12 pages (with machine translation).

* cited by examiner

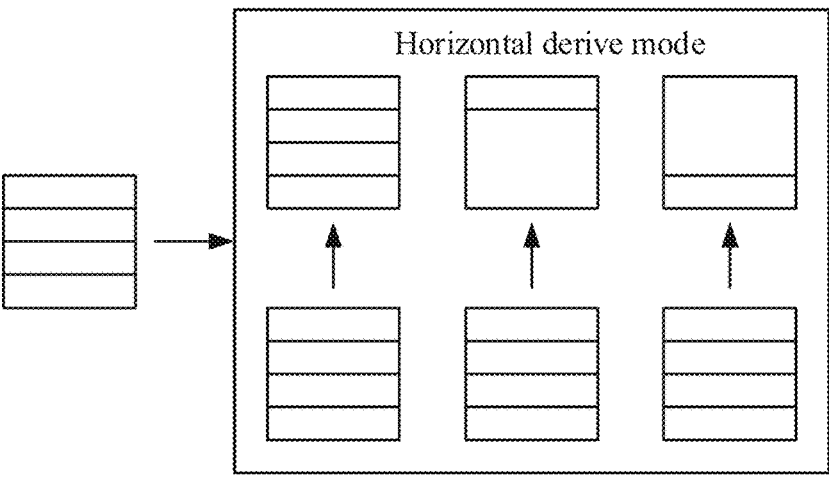
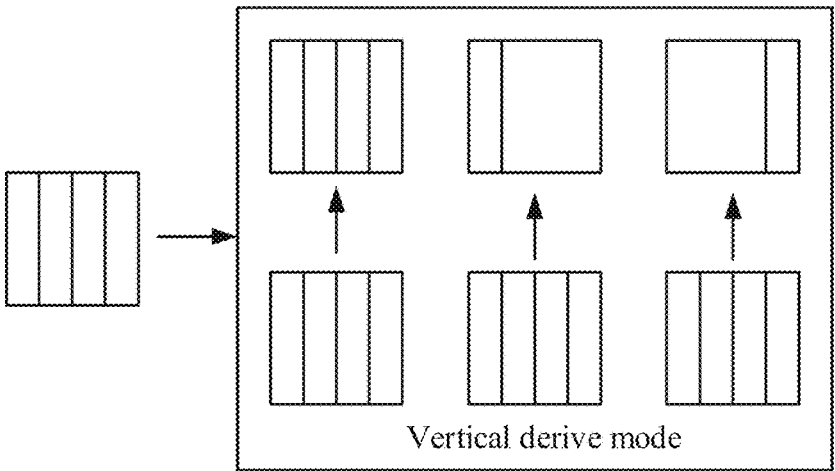
FIG. 2B
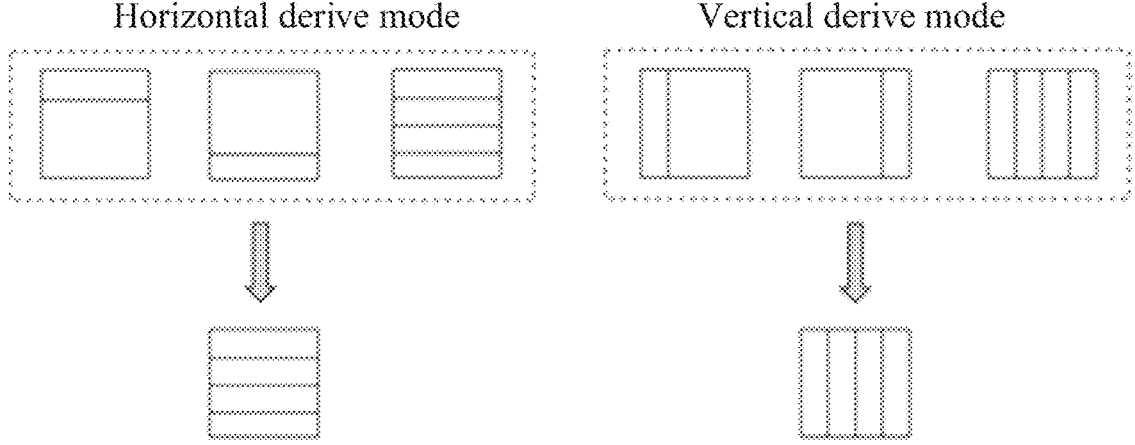
FIG. 2C

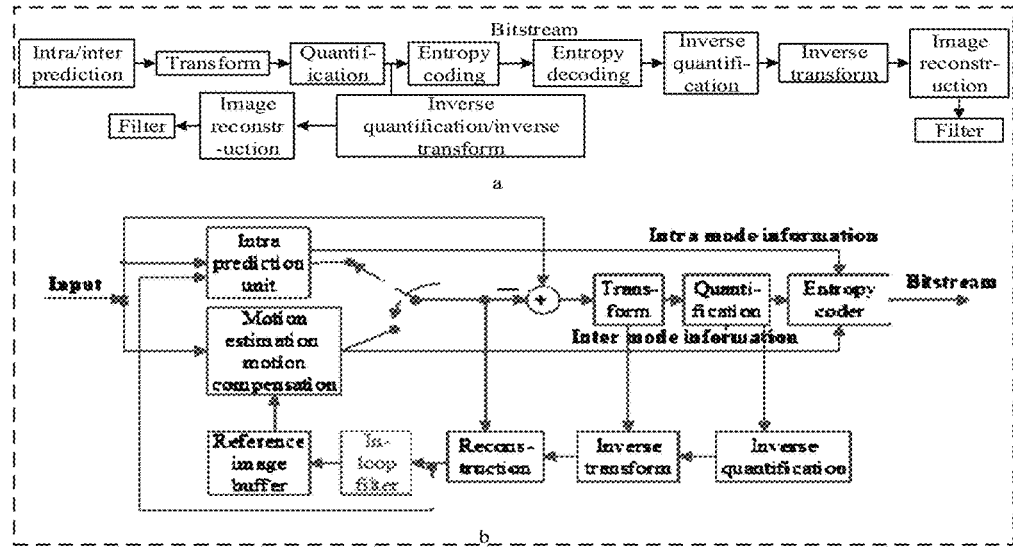

FIG. 4

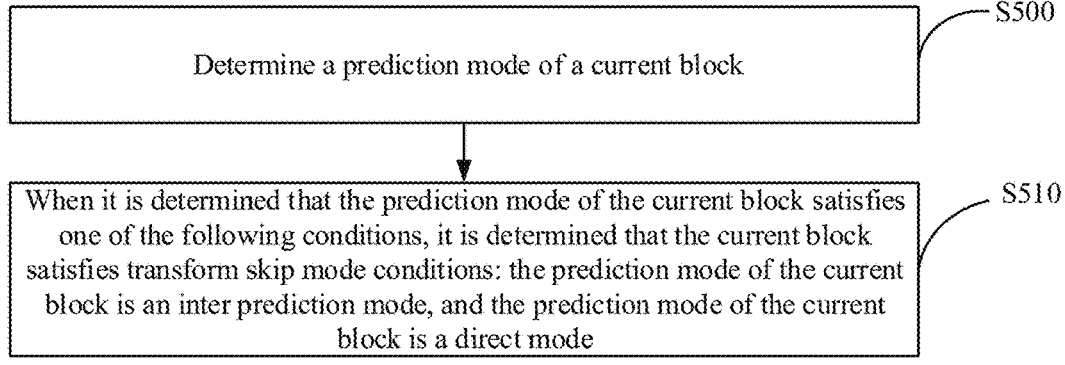

Determine a prediction mode of a current block ⟶ S500

When it is determined that the prediction mode of the current block satisfies one of the following conditions, it is determined that the current block satisfies transform skip mode conditions: the prediction mode of the current block is an inter prediction mode, and the prediction mode of the current block is a direct mode ⟶ S510

FIG. 5

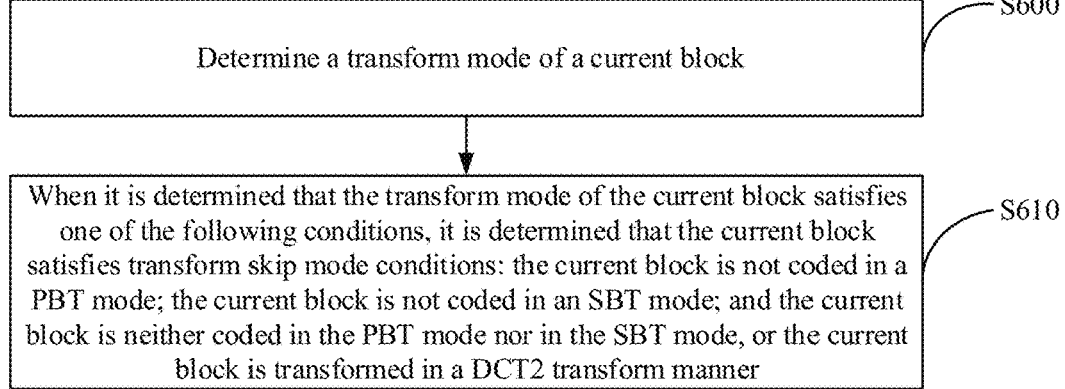

Determine a transform mode of a current block ⟶ S600

When it is determined that the transform mode of the current block satisfies one of the following conditions, it is determined that the current block satisfies transform skip mode conditions: the current block is not coded in a PBT mode; the current block is not coded in an SBT mode; and the current block is neither coded in the PBT mode nor in the SBT mode, or the current block is transformed in a DCT2 transform manner ⟶ S610

FIG. 6

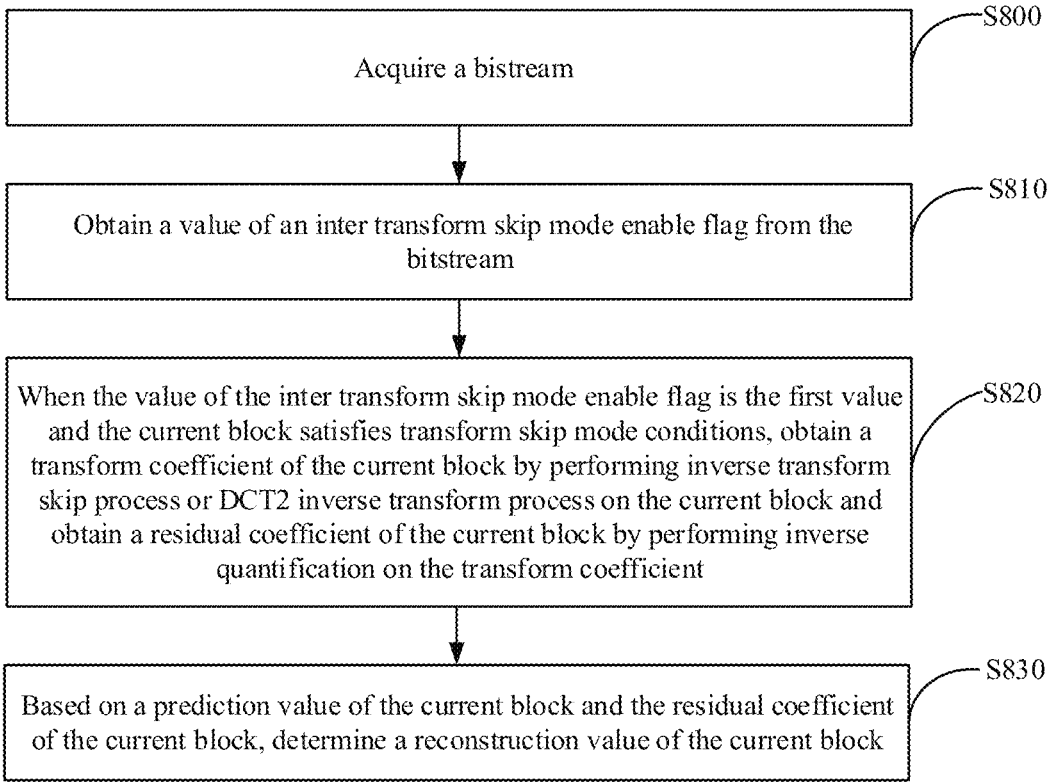

When the current block is not coded in the inter prediction filter mode, it is determined that the current block satisfies the transform skip mode conditions ⟋ S700

FIG. 7

Acquire a bistream ⟋ S800

Obtain a value of an inter transform skip mode enable flag from the bitstream ⟋ S810

When the value of the inter transform skip mode enable flag is the first value and the current block satisfies transform skip mode conditions, obtain a transform coefficient of the current block by performing inverse transform skip process or DCT2 inverse transform process on the current block and obtain a residual coefficient of the current block by performing inverse quantification on the transform coefficient ⟋ S820

Based on a prediction value of the current block and the residual coefficient of the current block, determine a reconstruction value of the current block ⟋ S830

FIG. 8

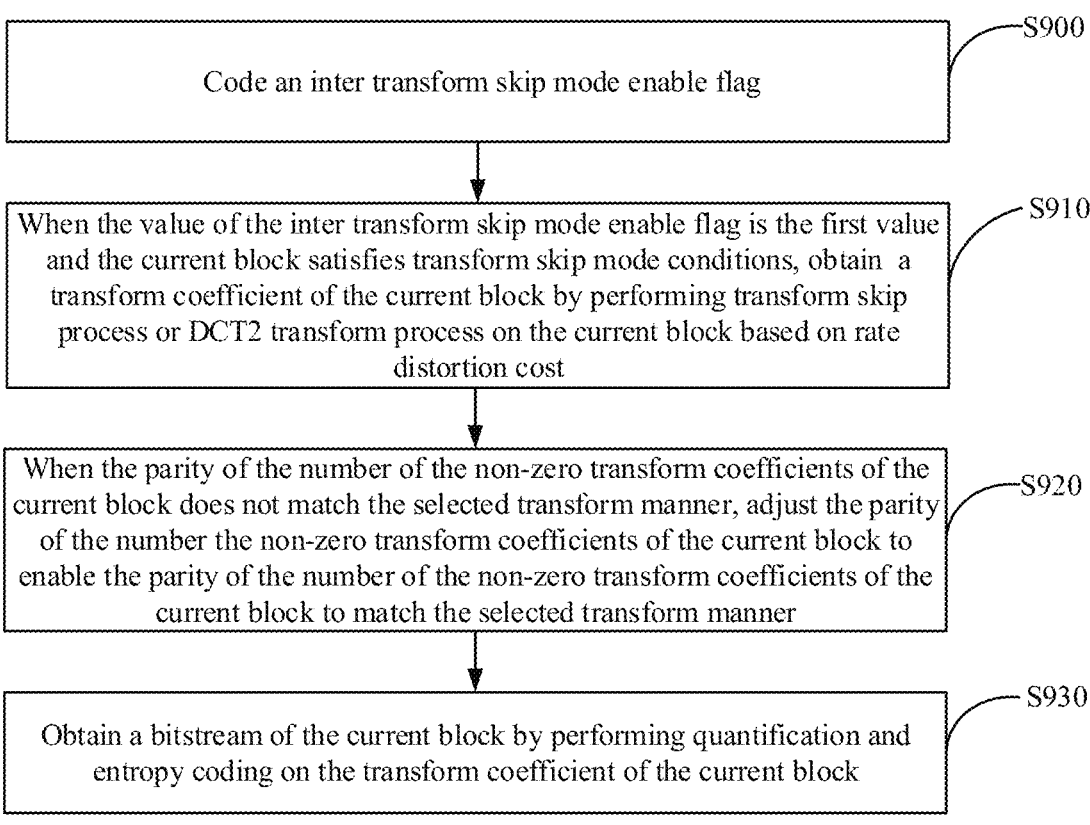

S900

Code an inter transform skip mode enable flag

S910

When the value of the inter transform skip mode enable flag is the first value and the current block satisfies transform skip mode conditions, obtain a transform coefficient of the current block by performing transform skip process or DCT2 transform process on the current block based on rate distortion cost

S920

When the parity of the number of the non-zero transform coefficients of the current block does not match the selected transform manner, adjust the parity of the number the non-zero transform coefficients of the current block to enable the parity of the number of the non-zero transform coefficients of the current block to match the selected transform manner

S930

Obtain a bitstream of the current block by performing quantification and entropy coding on the transform coefficient of the current block

FIG. 9

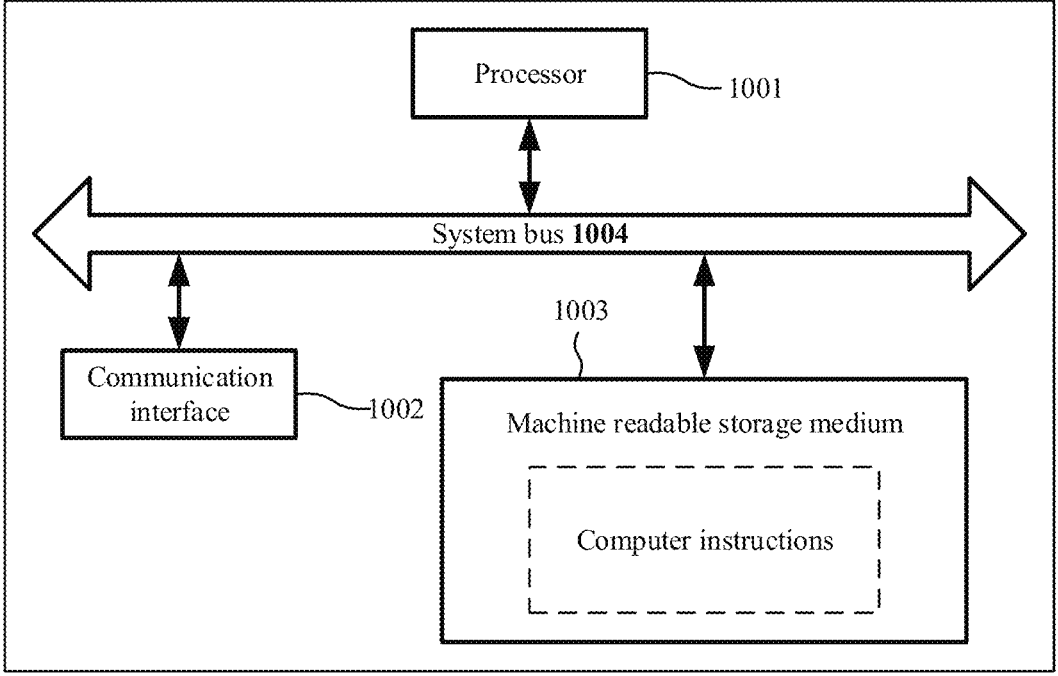

Processor — 1001

System bus 1004

1003

Communication interface —1002

Machine readable storage medium

Computer instructions

FIG. 10

CODING AND DECODING METHODS AND APPARATUSES

CROSS REFERENCE TO RELATED APPLICATIONS

The present application is a U.S. national phase of International Application No. PCT/CN2021/098009, filed on Jun. 2, 2021, which claims priority to Chinese Patent Application No. 202010508168.9 entitled "CODING AND DECODING METHODS AND APPARATUSES" filed on Jun. 5, 2020, the entire contents of which are incorporated herein by reference.

TECHNICAL FIELD

The present disclosure relates to video coding and decoding technologies and in particular to coding and decoding methods and apparatuses.

BACKGROUND

Generally, video coding includes operations such as prediction, transform, quantification, entropy coding and filter, where the prediction includes an intra prediction and an inter prediction.

The transform refers to transforming an image described in a form of pixels in a spatial domain into an image in a transform domain, which is expressed in a form of a transform coefficient. Since most images include many flat regions and regions slowly changing in pixel value, a proper transform process can transform a scattered distribution of image energy in the spatial domain into a relatively concentrated distribution of image energy in the transform domain. Therefore, correlation in a frequency domain between signals can be removed, and in cooperation with a quantification process, bitstream data can be effectively compressed.

At present, for videos with screen content coding (SCC), Discrete Cosine Transform (DCT)2, DCT8 or DST7 transform kernel-based transform methods are still used to transform temporal domain signals into frequency domain signals with more centralized energy, and in cooperation with quantification and entropy coding, improvement can be brought to coding performance. However, for videos with SCC, their texture is simple, and in cooperation with an intra block copy (IBC) prediction mode, small residual coefficients of residual blocks are acquired. Therefore, in most cases, it is not required to perform conventional transform operation but perform transform skip process, and quantification and entropy coding are performed after simple shift operation. In this way, the coding performance can be improved and the simple shift operation will not increase the coding implementation cost. On the contrary, because a transform operation is not required, decoding time can be greatly reduced. Thus, a cu-level implicit transform skip mode is proposed to greatly improve the coding performance of videos with SCC.

In the solution of Implicit Selection of Transform Skip mode (ISTS), by using parity of a number of non-zero transform coefficients of a current block, a coding device is indicated to perform transform skip process or DCT2 transform process on the current block.

However, practices show that the current ISTS solution is only applied to the intra prediction mode and the IBC mode, bringing many limitations to its applications.

SUMMARY

In view of the above, the present disclosure provides coding methods, decoding methods, coding apparatuses and decoding apparatuses.

Specifically, the present disclosure is carried out by using the following technical solutions.

According to a first aspect of embodiments of the present disclosure, there is provided a decoding method, including:

determining whether a current block satisfies transform skip mode conditions; if the transform skip mode conditions are satisfied, obtaining a residual coefficient of the current block by performing inverse transform skip process or DCT2 inverse transform process on the current block; obtaining a reconstruction value of the current block by adding the residual coefficient of the current block to a prediction value of the current block;

where determining the current block satisfies the transform skip mode conditions includes the followings: a prediction mode of the current block is an inter prediction mode, the current block is a luma block, and a width and a height of the current block both are less than 64.

According to a second aspect of embodiments of the present disclosure, there is provided a decoding method, including:

determining whether a current block satisfies transform skip mode conditions; if the transform skip mode conditions are satisfied, obtaining a residual coefficient of the current block by performing inverse transform skip process or DCT2 inverse transform process on the current block; obtaining a reconstruction value of the current block by adding the residual coefficient of the current block to a prediction value of the current block;

where determining the current block satisfies the transform skip mode conditions includes the followings:

a prediction mode of the current block is a direct mode, the current block is a luma block, and a width and a height of the current block both are less than 64.

According to a third aspect of embodiments of the present disclosure, there is provided a decoding method, including:

determining whether a current block satisfies transform skip mode conditions; if the transform skip mode conditions are satisfied, obtaining a residual coefficient of the current block by performing inverse transform skip process or DCT2 inverse transform process on the current block; obtaining a reconstruction value of the current block by adding the residual coefficient of the current block to a prediction value of the current block;

where determining the current block satisfies the transform skip mode conditions includes the followings:

a prediction mode of the current block is a direct mode, the current block is not coded in an inter prediction filter mode, the current block is a luma block, and a width and a height of the current block both are less than 64.

According to a fourth aspect of embodiments of the present disclosure, there is provided a decoding method, including:

determining whether a current block satisfies transform skip mode conditions; if the transform skip mode conditions are satisfied, obtaining a residual coefficient of the current block by performing inverse transform skip process or DCT2 inverse transform process on the current block; obtaining a reconstruction value of the current block by adding the residual coefficient of the current block to a prediction value of the current block;

where determining the current block satisfies the transform skip mode conditions includes the followings: a prediction mode of the current block is an inter prediction mode.

According to a fifth aspect of embodiments of the present disclosure, there is provided a decoding method, including:
determining whether a current block satisfies transform skip mode conditions; if the transform skip mode conditions are satisfied, obtaining a residual coefficient of the current block by performing inverse transform skip process or DCT2 inverse transform process on the current block; obtaining a reconstruction value of the current block by adding the residual coefficient of the current block to a prediction value of the current block;
where determining the current block satisfies the transform skip mode conditions includes the followings:
a prediction mode of the current block is a direct mode.

According to a sixth aspect of embodiments of the present disclosure, there is provided a decoding method, including:
determining whether a current block satisfies transform skip mode conditions; if the transform skip mode conditions are satisfied, obtaining a residual coefficient of the current block by performing inverse transform skip process or DCT2 inverse transform process on the current block; obtaining a reconstruction value of the current block by adding the residual coefficient of the current block to a prediction value of the current block;
where determining the current block satisfies the transform skip mode conditions includes the followings:
a prediction mode of the current block is a direct mode, and the current block is not coded in an inter prediction filter mode.

According to a seventh aspect of embodiments of the present disclosure, there is provided a coding method, including:
determining whether a current block satisfies transform skip mode conditions; if the current block satisfies the transform skip mode conditions, obtaining a transform coefficient of the current block by performing transform skip process or DCT2 transform process on the current block based on rate distortion optimization (RDO); obtaining a bitstream of the current block by performing quantification and entropy coding on the transform coefficient of the current block;
where determining the current block satisfies the transform skip mode conditions includes the followings: a prediction mode of the current block is an inter prediction mode, the current block is a luma block, and a width and a height of the current block both are less than 64.

According to an eighth aspect of embodiments of the present disclosure, there is provided a coding method, including:
determining whether a current block satisfies transform skip mode conditions; if the current block satisfies the transform skip mode conditions, obtaining a transform coefficient of the current block by performing transform skip process or DCT2 transform process on the current block based on rate distortion optimization (RDO); obtaining a bitstream of the current block by performing quantification and entropy coding on the transform coefficient of the current block;
where determining the current block satisfies the transform skip mode conditions includes the followings: a prediction mode of the current block is a direct mode, the current block is a luma block, and a width and a height of the current block both are less than 64.

According to a ninth aspect of embodiments of the present disclosure, there is provided a coding method, including:
determining whether a current block satisfies transform skip mode conditions; if the current block satisfies the transform skip mode conditions, obtaining a transform coefficient of the current block by performing transform skip process or DCT2 transform process on the current block based on rate distortion optimization (RDO); obtaining a bitstream of the current block by performing quantification and entropy coding on the transform coefficient of the current block;
where determining the current block satisfies the transform skip mode conditions includes the followings: a prediction mode of the current block is a direct mode, the current block is not coded in an inter prediction filter mode, the current block is a luma block, and a width and a height of the current block both are less than 64.

According to a tenth aspect of embodiments of the present disclosure, there is provided a coding method, including:
determining whether a current block satisfies transform skip mode conditions; if the current block satisfies the transform skip mode conditions, obtaining a transform coefficient of the current block by performing transform skip process or DCT2 transform process on the current block based on rate distortion optimization (RDO); obtaining a bitstream of the current block by performing quantification and entropy coding on the transform coefficient of the current block;
where determining the current block satisfies the transform skip mode conditions includes the followings: a prediction mode of the current block is an inter prediction mode.

According to an eleventh aspect of embodiments of the present disclosure, there is provided a coding method, including:
determining whether a current block satisfies transform skip mode conditions; if the current block satisfies the transform skip mode conditions, obtaining a transform coefficient of the current block by performing transform skip process or DCT2 transform process on the current block based on rate distortion optimization (RDO); obtaining a bitstream of the current block by performing quantification and entropy coding on the transform coefficient of the current block;
where determining current block satisfies the transform skip mode conditions includes the followings: a prediction mode of the current block is a direct mode.

According to a twelfth aspect of embodiments of the present disclosure, there is provided a coding method, including:
determining whether a current block satisfies transform skip mode conditions; if the current block satisfies the transform skip mode conditions, obtaining a transform coefficient of the current block by performing transform skip process or DCT2 transform process on the current block based on rate distortion optimization (RDO); obtaining a bitstream of the current block by performing quantification and entropy coding on the transform coefficient of the current block;
where determining the current block satisfies the transform skip mode conditions includes the followings: a prediction mode of the current block is a direct mode, and the current block is not coded in an inter prediction filter mode.

According to a thirteenth aspect of embodiments of the present disclosure, there is provided a decoding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; obtain a reconstruction value of the current block by adding the residual coefficient of the current block to a prediction value of the current block;

where determining the current block satisfies the transform skip mode conditions includes the followings: a prediction mode of the current block is an inter prediction mode, the current block is a luma block, and a width and a height of the current block both are less than 64.

According to a fourteenth aspect of embodiments of the present disclosure, there is provided a decoding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; obtain reconstruction value of the current block by adding the residual coefficient of the current block to a prediction value of the current block;

where determining the current block satisfies the transform skip mode conditions includes the followings:

a prediction mode of the current block is a direct mode, the current block is a luma block, and a width and a height of the current block both are less than 64.

According to a fifteenth aspect of embodiments of the present disclosure, there is provided a decoding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; obtain a reconstruction value of the current block by adding the residual coefficient of the current block to a prediction value of the current block;

where determining the current block satisfies the transform skip mode conditions includes the followings:

a prediction mode of the current block is a direct mode, the current block is not coded in an inter prediction filter mode, the current block is a luma block, and a width and a height of the current block both are less than 64.

According to a sixteenth aspect of embodiments of the present disclosure, there is provided a decoding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; obtain a reconstruction value of the current block by adding the residual coefficient of the current block to a prediction value of the current block;

where determining the current block satisfies the transform skip mode conditions includes the followings: a prediction mode of the current block is an inter prediction mode.

According to a seventeenth aspect of embodiments of the present disclosure, there is provided a decoding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; obtain a reconstruction value of the current block by adding the residual coefficient of the current block to a prediction value of the current block;

where determining the current block satisfies the transform skip mode conditions includes the followings:

a prediction mode of the current block is a direct mode.

According to an eighteenth aspect of embodiments of the present disclosure, there is provided a decoding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; obtain a reconstruction value of the current block by adding the residual coefficient of the current block to a prediction value of the current block;

where determining the current block satisfies the transform skip mode conditions includes the followings:

a prediction mode of the current block is a direct mode, and the current block is not coded in an inter prediction filter mode.

According to a nineteenth aspect of embodiments of the present disclosure, there is provided a coding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the current block satisfies the transform skip mode conditions, obtain a transform coefficient of the current block by performing transform skip process or DCT2 transform process on the current block based on rate distortion optimization (RDO); obtain a bitstream of the current block by performing quantification and entropy coding on the transform coefficient of the current block;

where determining the current block satisfies the transform skip mode conditions includes the followings: a prediction mode of the current block is an inter prediction mode, the current block is a luma block, and a width and a height of the current block both are less than 64.

According to a twentieth aspect of embodiments of the present disclosure, there is provided a coding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the current block satisfies the transform skip mode conditions, obtain a transform coefficient of the current block by performing transform skip process or DCT2 transform process on the current block based on rate distortion optimization (RDO); obtain a bitstream of the current block by performing quantification and entropy coding on the transform coefficient of the current block;

where determining the current block satisfies the transform skip mode conditions includes the followings: a prediction mode of the current block is a direct mode, the current block is a luma block, and a width and a height of the current block both are less than 64.

According to a twenty-first aspect of embodiments of the present disclosure, there is provided a coding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the current block satisfies the transform skip mode conditions, obtain a transform coefficient of the current block by performing transform skip process or DCT2 transform process on the current block based on rate distortion optimization (RDO); obtain a bitstream of the current block by performing quantification and entropy coding on the transform coefficient of the current block;

where determining the current block satisfies the transform skip mode conditions includes the followings: a prediction mode of the current block is a direct mode, the current block is not coded in an inter prediction filter mode, the current block is a luma block, and a width and a height of the current block both are less than 64.

According to a twenty-second aspect of embodiments of the present disclosure, there is provided a coding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the current block satisfies the transform skip mode conditions, obtain a transform coefficient of the current block by performing transform skip process or DCT2 transform process on the current block based on rate distortion optimization (RDO); obtain a bitstream of the current block by performing quantification and entropy coding on the transform coefficient of the current block;

where determining the current block satisfies the transform skip mode conditions includes the followings: a prediction mode of the current block is an inter prediction mode.

According to a twenty-third aspect of embodiments of the present disclosure, there is provided a coding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the current block satisfies the transform skip mode conditions, obtain a transform coefficient of the current block by performing transform skip process or DCT2 transform process on the current block based on rate distortion optimization (RDO); obtain a bitstream of the current block by performing quantification and entropy coding on the transform coefficient of the current block;

where determining the current block satisfies the transform skip mode conditions includes the followings: a prediction mode of the current block is a direct mode.

According to a twenty-fourth aspect of embodiments of the present disclosure, there is provided a coding apparatus, including: a processor, a communication interface, a machine readable storage medium and a communication bus, where the processor, the communication interface, and the machine readable storage medium communicate with each other via the communication bus; the machine readable storage medium stores a computer program, and the computer program is executed by the processor to:

determine whether a current block satisfies transform skip mode conditions; if the current block satisfies the transform skip mode conditions, obtain a transform coefficient of the current block by performing transform skip process or DCT2 transform process on the current block based on rate distortion optimization (RDO); obtain a bitstream of the current block by performing quantification and entropy coding on the transform coefficient of the current block;

where determining the current block satisfies the transform skip mode conditions includes the followings: a prediction mode of the current block is a direct mode, and the current block is not coded in an inter prediction filter mode.

According to a twenty-fifth aspect of embodiments of the present disclosure, there is provided a machine readable storage medium, storing a computer instruction thereon, where the computer instruction is executed by a processor to perform the method of any one of the above aspects.

In the decoding methods of embodiments of the present disclosure, a bitstream is acquired and a value of an inter transform skip mode enable flag is obtained from the bit-stream; when the value of the inter transform skip mode enable flag is a first value and the current block satisfies transform skip mode conditions, a transform coefficient of the current block is obtained by performing inverse trans-form skip process or DCT2 inverse transform process on the current block based on parity of a number of the non-zero transform coefficients of the current block, and a residual coefficient of the current block is obtained by performing inverse quantification on the transform coefficient. Further, based on a prediction value of the current block and the residual coefficient of the current block, a reconstruction value of the current block is determined. By adding the inter transform skip mode enable flag, the application of the transform skip mode of the inter prediction mode and/or direct mode can be controlled, thereby improving the flex-ibility and controllability of the application of the transform skip mode and enhancing the flexibility and controllability of the application of the ISTS solutions. Furthermore, by applying the ISTS solutions to the inter prediction mode and/or direct mode, the application scope of the ISTS solutions is extended, and thus coding performance is improved and the decoding delay is reduced.

BRIEF DESCRIPTION OF THE DRAWINGS

FIGS. 2A to 2B are derive schematic diagrams of DT partition mode.

FIG. 2C is a schematic diagram of a transform under a DT partition mode.

FIG. 4 is a schematic diagram illustrating a coding and decoding method according to an embodiment of the present disclosure.

FIG. 5 is a flowchart illustrating an image processing method according to an embodiment of the present disclo-sure.

FIG. 6 is a flowchart illustrating another image processing method according to another embodiment of the present disclosure.

FIG. 7 is a flowchart illustrating another image processing method according to another embodiment of the present disclosure.

FIG. 8 is a flowchart illustrating a decoding method according to an embodiment of the present disclosure.

FIG. 9 is a flowchart illustrating a coding method accord-ing to an embodiment of the present disclosure.

FIG. 10 is a schematic diagram illustrating a hardware structure of a decoding apparatus according to an embodi-ment of the present disclosure.

DETAILED DESCRIPTION OF THE EMBODIMENTS

Figure 1A:
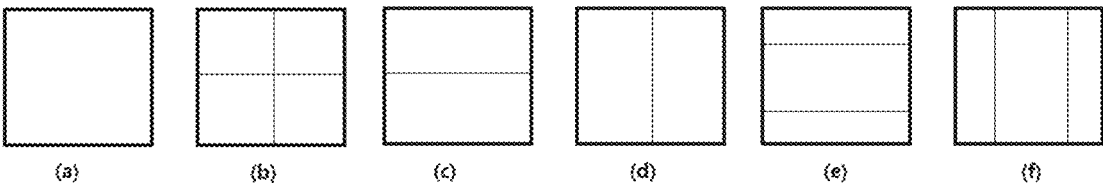
FIGS. 1A to 1B are schematic diagrams of block partition according to an embodiment of the present disclosure.

Embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments con-sistent with the present disclosure. Rather, they are merely examples of apparatuses and methods consistent with some aspects of the present disclosure as detailed in the appended claims.

The terms used in the present disclosure are used only to describe a particular embodiment rather than limit the pres-ent disclosure. The terms "a", "said" and "the" in singular forms used in the present specification and the appended claims are also intended to include plural forms, unless otherwise clearly indicated in the context.

In order to enable those skilled in the art to better understand the technical solutions of the embodiments of the present disclosure, brief descriptions are made to block partition technology in existing video coding standard, exist-ing intra subblock partition solution and some technical terms involved in the embodiments of the present disclosure.

I. Block Partition Technology in Existing Video Coding Standard

In High Efficiency Video Coding (HEVC), one Coding Tree Unit (CTU) is partitioned into Coding Units (CU) by using quad tree recursion. At a leaf node CU level, whether to use intra coding or inter coding is determined. The CU can be further partitioned into two or four Prediction Units (PU) and same prediction information is used in one PU. After residual information is obtained following completion of prediction, one CU can be further quad-partitioned into several Transform Units (TU). For example, a current image block in the present disclosure is one PU.

Figure 1B:
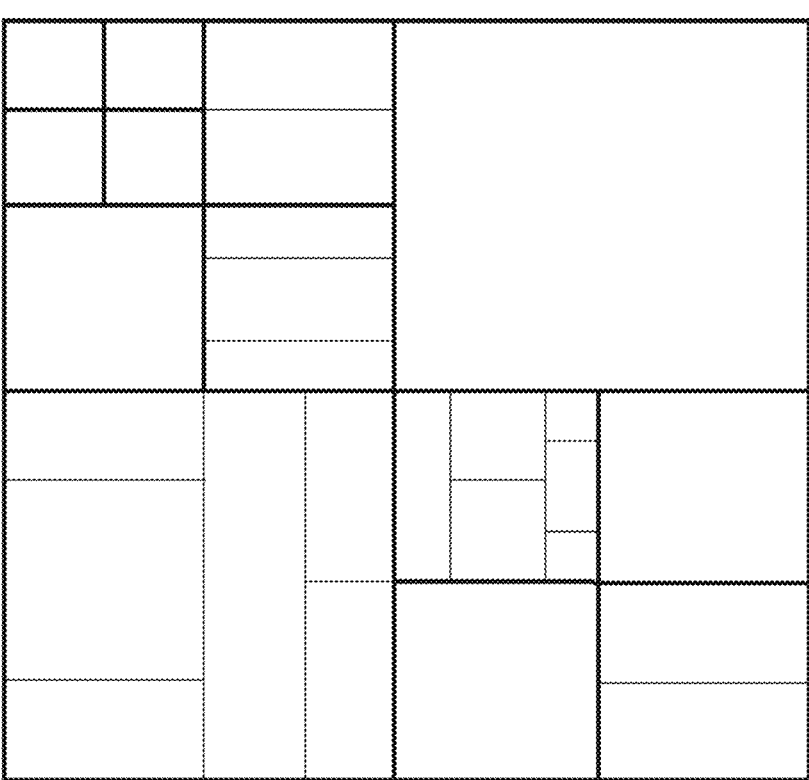

However, noticeable changes occur to the block partition technology in the Versatile Video Coding (VVC) proposed recently. A partition structure including binary tree/ternary tree/quad tree replaces the original partition mode, cancels differentiation of the prior concepts of the CU, PU and TU, and supports a more flexible partition manner of CUs. The CU may be of square or rectangular partition type. The CTU is firstly partitioned based on quad tree and then leaf nodes obtained by the quad tree partition can be further partitioned based on binary tree and ternary tree. As shown in FIG. 1A, CUs have a total of five partition types, which are quad tree partition, horizontal binary tree partition, vertical binary tree partition, horizontal ternary tree partition, and vertical ter-nary tree partition respectively. As shown in FIG. 1B, the CUs in a CTU may be of any combination of the five partition types. It can be known that different partition manners can enable the PUs to have different shapes, for example, rectangles and squares of different sizes.

II. Technical Terms

1. Transform kernel: in video coding, transform is an indispensable stage for realizing video data compression to enable signal energy to be more centralized. The transform technologies based on Discrete Cosine Transform (DCT)/Discrete Sine Transform (DST) are major transform technologies of video coding. The DCT and DST are further divided into several transform kernels based on different basis functions. Three common transform kernels are shown in Table 1 below.

TABLE 1

| Transform kernel type | Basis function $T_i(j)$, i, j = 0, 1, . . . , N − 1 |
|---|---|
| DCT2 | $T_i(j) = \omega_0 \cdot \sqrt{\dfrac{2}{N}} \cdot \cos\left(\dfrac{\pi \cdot i \cdot (2j+1)}{2N}\right)$ <br><br> Where $\omega_0 = \begin{cases} \sqrt{\dfrac{2}{N}} & i = 0 \\ 1 & i \neq 0 \end{cases}$ |
| DCT8 | $T_i(j) = \sqrt{\dfrac{4}{2N+1}} \cdot \cos\left(\dfrac{\pi \cdot (2i+1) \cdot (2j+1)}{4N+2}\right)$ |
| DST7 | $T_i(j) = \sqrt{\dfrac{4}{2N+1}} \cdot \sin\left(\dfrac{\pi \cdot (2i+1) \cdot (j+1)}{2N+1}\right)$ |

2. Forward transform and inverse transform: a video coding process includes a forward transform process and an inverse transform process which are also called forward transform and inverse transform.

The forward transform is to transform a two-dimensional residual signal (residual coefficient) into a two-dimensional spectrum signal (transform coefficient) with more centralized energy, where the transform coefficient undergoes quantification to effectively remove a high frequency component and retain medium and low frequency components, so as to realize video data compression.

In some examples, the forward transform can be expressed as the following equation in a form of matrix as follows:

$$F = B \cdot f \cdot A^T$$

where f represents an original residual signal of N×M dimensions, M represents a width of a residual block, N represents a height of a residual block, F represents a frequency domain signal of N×M dimensions; A and B represent transform matrices of M×M and N×N dimensions, both of which satisfy orthogonality.

The inverse transform is a reverse process of the forward transform. By using the orthogonal transform matrices A and B, the frequency domain signal F is transformed into a temporal domain residual signal f.

In some examples, the inverse transform can be expressed as the following equation in a form of matrix:

$$f = B^T \cdot F \cdot A$$

3. Horizontal transform and vertical transform: in a transform stage of video coding, one two-dimensional residual signal is input. As shown below, let $X = A \cdot f^T$, and thus $F = B \cdot X^T$, namely, $$F = B \cdot f \cdot A^T = B(A \cdot f^T)^T$$

Therefore, the forward transform of one two-dimensional signal can be achieved by two one-dimensional forward transforms. One signal X of M*N is obtained through a first forward transform in which correlation between horizontal pixels of the two-dimensional residual signal is removed, and thus the first forward transform can also be referred to as horizontal transform and A is referred to as a horizontal transform matrix. In a second forward transform, correlation between vertical pixels of the two-dimensional residual signal is removed and thus the second forward transform is also referred to as vertical transform and B is also referred to as vertical transform matrix.

4. Transform pair: it is also referred to as transform kernel pair. In a next-generation video coding standard, TUs support matrix blocks. Thus, M may not be equal to N and A may not be equal to B in dimension. In addition, the next-generation video coding standard also supports the followings: A and B are not transform matrices generated by a same transform kernel. Hence, in a transform, a transform kernel pair (H, V) formed by transform kernels corresponding to A and B is present, where H refers to a horizontal transform kernel and V refers to a vertical transform kernel.

5. Secondary transform: the secondary transform is a technology adopted in AVS2, which is inherited by AVS3; different transform kernels are used for 4×4 blocks and non-4×4 blocks.

6. Derive Tree (DT) partition mode: it is also referred to as "derive mode", which, as a new partition mode, can generate new partition shapes and further obtain performance gain.

Figure 2A:
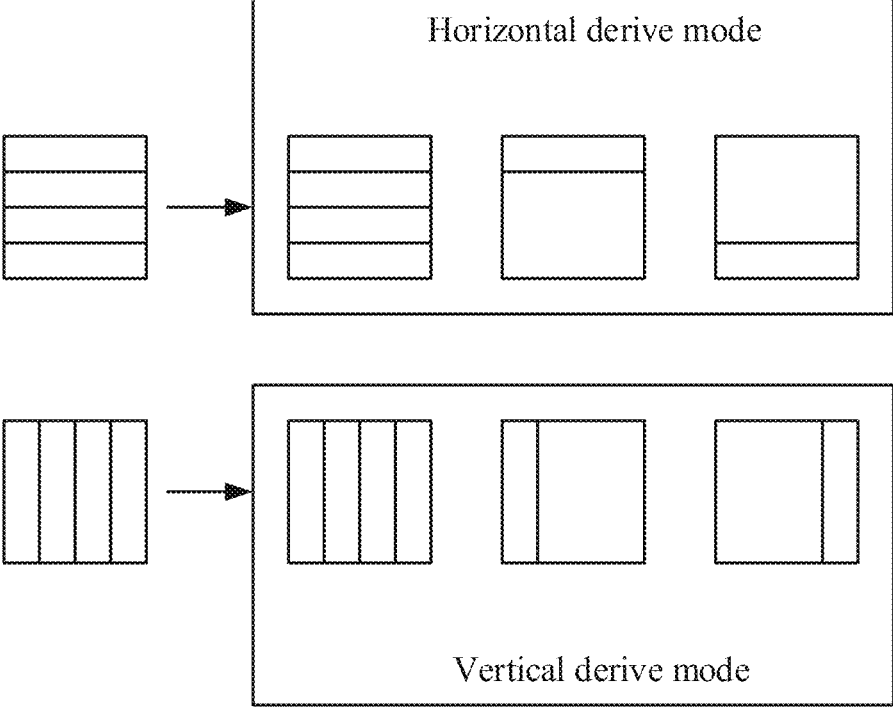

In some examples, the DT partition mode may include a horizontal derive mode and a vertical derive mode as schematically shown in FIG. 2A.

In some examples, the DT partition mode may grow on a leaf node of a quad tree or a binary tree. As shown in FIG. 2B, for I frames or non-I frames, the DT partition mode may obtain different PU partitions of the derive mode (2N×hN, 2N×nU, 2N×nD, hN×2N, nL×2N or nR×2N) by combining partition boundaries of CUs.

In some examples, for an intra mode, CUs predicted using the derive mode may use four non-square blocks for transform quantification without introducing a new transform kernel as schematically shown in FIG. 2C.

In some examples, the CUs coded in the horizontal derive mode must satisfy the following two conditions:
1) height is greater than or equal to 16 and less than or equal to 64; and
2) a ratio of width to height is less than 4.

The CUs coded in the vertical derive mode must satisfy the following two conditions:
1) width is greater than or equal to 16 and less than or equal to 64; and
2) a ratio of height to width is less than 4.

7. Position-based transform (PBT) mode: for a conventional inter residual transform, the transform unit is same as the coding unit and will be no longer partitioned, and a transform process is performed using the conventional DCT2 transform manner. Nevertheless, the inter residual is not a natural image and does not have stable characteristics but diversity. Hence, the conventional DCT2 transform manner used herein may not be an optimal transform manner, and a residual amplitude close to a prediction boundary is relative large. Therefore, for inter residual blocks within a size range (square blocks or non-square blocks), the PBT mode or the conventional DCT2 transform manner may be used. Further, an optimal transform manner may be selected based on rate distortion optimization and then identified in the bitstream.

Figure 3A:
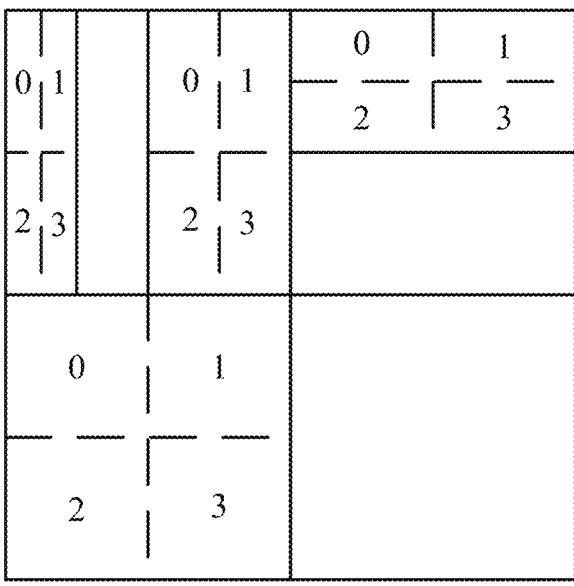
FIG. 3A is a schematic diagram of a subblock partition in a PBT mode according to an embodiment of the present disclosure.

In some examples, as shown in FIG. 3A, a solid line refers to boundaries of coding units, and a dotted line refers to subblock boundaries after PBT partition. Based on RDO, whether to use the PBT mode or the DCT2 transform manner for the coding unit is determined.

As shown in FIG. 3A, the subblocks after PBT partition are identified as 0 to 3 respectively. Based on the positions of the subblocks 0 to 3, information of the transform kernel pair is determined without coding the index of the transform kernel pair in the bitstream.

8. Sub-Block Transform (SBT) mode: an inter residual block is partitioned into two subblocks, where a residual of one block thereof is 0 by default, and a residual of the other is non-zero by default; there are eight options for the size and position of the non-zero residual subblock (these information is transmitted in a bistream). For the transform of the non-zero residual subblock, the DCT8/DST7 transform manner may be adaptively selected as horizontal transform manner and vertical transform manner based on the position of the subblock.

Figure 3B:
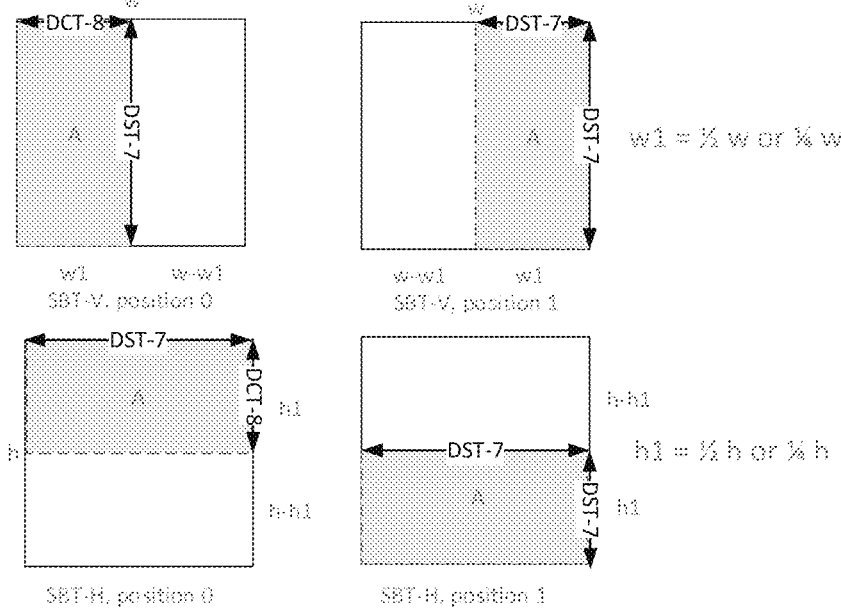
FIG. 3B is a schematic diagram of a subblock partition in a SBT mode according to an embodiment of the present disclosure.

In some examples, as shown in FIG. 3B, there may be eight subblock transform modes.

9. Inter prediction filter mode: the inter prediction filter technology is a technology adopted in AVS3, which is applied under a direct mode to eliminate a discontinuity problem in a spatial domain between the prediction block and surrounding pixels, which results from inter prediction.

In some examples, the inter prediction filter further includes a regular inter prediction filter and an enhanced inter prediction filter.

(1) Regular inter prediction filter (interpf)

The regular inter prediction filter means that, after an inter prediction value is obtained using an inter prediction, an intra prediction value is obtained using an intra prediction and then a final prediction value is obtained by performing weighting on the inter prediction value and the intra prediction value.

The flow of the regular inter prediction filter is as follows:

(a) A prediction block Q is obtained using an intra planar mode.

$$Q(x,y)=(Pred\_V(x,y)+Pred\_H(x,y)+1)>>2$$

$$Pred\_V(x,y)=((h-1-y)*Recon(x,-1)+(y+1)*Recon(-1, h)+(h>>1))>>\log 2(h)$$

$$Pred\_H(x,y)=((w-1-x)*Recon(-1,y)+(x+1)*Recon (w,-1)+(w>>1))>>\log 2(w)$$

where w and h refer to a width and a height of the current block, x and y refer to a relative coordinate inside the current block, and Recon(x, y) refers to a value of the surrounding reconstructed pixels.

(b) A final prediction block is obtained by performing 5:3 weighting based on an inter prediction block P and an intra prediction block Q.

$$P'(x,y)=(P(x,y)*5+Q(x,y)*3+4)>>3$$

where P (x, y) refers to a prediction value obtained by inter prediction, and P' (x, y) refers to a prediction value obtained by filter.

(2) Enhanced inter prediction filter (enhance interpf)

The enhanced inter prediction filter means that, after an inter prediction value is obtained using an inter prediction, with one column of reconstructed pixels at the left size of the current block and one row of reconstructed pixels at top as reference pixels, filtering is performed on the current prediction block by using a 3-tap filter. The filtering process is as follows:

$$P'(x,y)=f(x)P(-1,y)+f(y)P(x,-1)+(1-f(x)-f(y))\cdot P(x,y)$$

where P'(x, y) refers to a prediction value obtained by filtering, P(x, y) refers to a prediction value obtained by inter prediction, f(x) and f(y) are filter coefficients, and N refers to a size of the prediction block.

In some examples, the sizes of different prediction blocks and the filter coefficients corresponding to distances from prediction pixels at the position coordinate (x, y) to the reference pixel are shown in Table 2.

TABLE 2

| | | Sizes of prediction blocks | | | | |
|---|---|---|---|---|---|---|
| | | 4 | 8 | 16 | 32 | 64 |
| Distance | 1 | 24 | 44 | 40 | 36 | 52 |
| from the | 2 | 6 | 25 | 27 | 27 | 44 |
| reference | 3 | 2 | 14 | 19 | 21 | 37 |
| pixel | 4 | 0 | 8 | 13 | 16 | 31 |
| | 5 | 0 | 4 | 9 | 12 | 26 |
| | 6 | 0 | 2 | 6 | 9 | 22 |
| | 7 | 0 | 1 | 4 | 7 | 18 |
| | 8 | 0 | 1 | 3 | 5 | 15 |
| | 9 | 0 | 0 | 2 | 4 | 13 |
| | 10 | 0 | 0 | 1 | 3 | 11 |

The size of the prediction block refers to a size of a width or height of an intra prediction block; and the distance from the reference pixel represents a prediction distance with a maximum set to 10.

The coefficients in Table 2 are amplified filter coefficients. For example, the first column corresponding to the size 4 represents that the width (height) of the current prediction block is 4 and the corresponding horizontal (vertical) filter coefficient should be a coefficient corresponding to the first column based on the prediction distance; the first row corresponding to the distance 1 represents that, when the prediction distance is 1, a coefficient corresponding to the first row should be used based on the width (height) of the current prediction block.

In some examples, the inter prediction filter can be identified as in Table 3.

TABLE 3

| Filter manner index | Filter type | Bitstream identifier |
|---|---|---|
| 0 | no filter | 0 |
| 1 | regular inter prediction filter | 10 |
| 2 | enhanced inter prediction filter | 11 |

A coding device selects an optimal filter manner based on RDO strategy and codes a corresponding bitstream identifier to a bitstream, and a decoding device determines a final filter manner by decoding the bitstream identifier.

10. Transform skip (TS) mode: after a residual block is obtained, a transform operation (including initial transform and secondary transform) is not performed on the current block but a simple shift operation is performed on the residual coefficient of the current block. The operations of the transform skip and the inverse transform skip are described below.

(1) Transform skip a) shift is calculated, and shift=15−BitDepth−((log M1+log M2)>>1), where BitDepth refers to a bit depth of an image, M1 refers to a width of the current block, and M2 refers to a height of the current block;

b) if shift≥0, carry factor nd_factor=1<<(shift−1), where a matrix C is obtained by a residual coefficient matrix ResiMatrix:

$$C_{ij}=(ResidueMatrix_{ij}+md\_factor)<<shift$$

c) if shift<0, let shift=−shift and the matrix C is obtained by a residual coefficient matrix ResiMatrix:

$$C_{ij}=(ResidueMatrix_{ij}+md\_factor)>>shift$$

d) the matrix C is taken as a transform coefficient matrix CoeffMatrix for quantification and entropy coding processes.

(2) Inverse transform skip a) shift is calculated, and shift=15−BitDepth−((log M1+log M2)>>1)

b) if shift≥0, carry factor md_factor=1<<(shift−1), where a matrix W is obtained by a transform coefficient matrix CoeffMatrix:

$$W_{ij}=(CoeffMatrix_{ij}+md\_factor)>>shift$$

c) if shift<0, let shift=−shift and the matrix W is obtained by the transform coefficient matrix CoeffMatrix:

$$W_{ij}=(CoeffMatrix_{ij}+md\_factor)<<shift$$

d) the matrix W is taken as a residual coefficient matrix ResidueMatrix for reconstruction process.

11. Rate distortion optimized (RDO): there are two major indicators for evaluating coding efficiency: a bit rate and a Peak Signal to Noise Ratio (PSNR). The smaller the bit rate is, the larger a compression rate is. The larger a PSNR is, the better a reconstructed image quality is. In mode selection, a discriminant equation is essentially a comprehensive evaluation on the two indicators.

A cost corresponding to a mode is: J(mode)=D+λ*R, where D represents distortion, which usually can be measured with an SSE indicator, where SSE refers to a mean square sum of differences between reconstructed blocks and a source image block; λ is a Lagrangian multiplier; R is an actual number of bits required for image block coding in this mode, including a sum of bits required for coding mode information, motion information, residuals, etc.

In mode selection, if RDO is used to make comparison decisions on coding modes, best coding performance can be usually guaranteed.

12. Skip mode: a coding device is not to transmit residual information or an MVD, but is to transmit a motion information index. A decoding device can deduce motion information on a current block by parsing the motion information index. After the motion information is acquired, the motion information is used to determine a prediction value, and the prediction value is used as a reconstruction value.

13. Direct mode: a coding device is to transmit residual information, but is not to transmit an MVD, but is to transmit a motion information index. A decoding device can deduce motion information on a current block by parsing the motion information index. After the motion information is acquired, the motion information is used to determine a prediction value, and a reconstruction value is obtained by adding the prediction value to a residual value.

14. Inter prediction mode: a coding device transmits the motion information index, the MVD, and the residual information etc.

In the skip mode or the direct mode, motion information on a current block completely multiplexes motion information on an adjacent block in a temporal or spatial domain. For example, one piece of motion information can be selected as the motion information on the current block from a set of motion information on a plurality of surrounding blocks. Therefore, in the skip mode or the direct mode, one index value can be coded to indicate which motion information in the set of motion information is used by the current block. A difference between the skip mode and the direct mode lies in that, in the skip mode, residuals are not to be coded, but, in the direct mode, residuals are to be coded. Thus, the skip mode or the direct mode can greatly save coding overhead for motion information.

In the direct mode, how to generate an inter prediction value can be determined by using multiple prediction modes, such as a regular direct mode, a subblock mode, a Merge with Motion Vector Difference mode (MMVD), an inter prediction filter (interpf) mode, an inter Angular Weighted Prediction (AWP) mode, and a Geometrical Partitioning mode (GEO).

The subblock mode may be an affine mode or a Subblock-based Temporal Motion Vector Prediction (SbTMVP) mode.

15. Implicit Selection of Transform Skip mode (ISTS): AVS-M5160 proposes an ISTS solution, and the coding device is required to select (DCT2, DCT2) or the transform skip mode based on RDO. In order to hide an ISTS flag, when the coding device selects (DCT2, DCT2), a number of the non-zero coefficients of the current block should be an even number; if the number of the non-zero transform coefficients is an odd number, the coding device enables the number of the non-zero transform coefficients of the current block to be an even number by setting the last non-zero transform coefficient to zero. Likewise, when the coding device selects the transform skip mode, the number of the non-zero transform coefficients of the current block should be an odd number; if the number of the non-zero transform coefficients of the current block is an even number, the coding device may enable the number of the non-zero transform coefficients of the current block to be an odd number by setting the last non-zero transform coefficient to zero.

In some examples, the transform manners of the ISTS can be selected as in Table 4.

TABLE 4

| The number of non-zero transform coefficients num_nz | Transform manner |
| --- | --- |
| num_nz%2 == 0 | (DCT2, DCT2) |
| num_nz%2 == 1 | TS |

A decoding device can obtain a transform manner of the current block based on Table 3 by calculating the parity of the number of the non-zero transform coefficients of the current block.

III. Main Flows of Existing Video Coding and Decoding

By referring to (a) in FIG. 4, with video coding as an example, the video coding usually includes prediction, transform, quantification, entropy coding and so on, and further, the coding process may also be implemented based on a framework in (b) of FIG. 4.

The prediction may include an intra prediction and an inter prediction. The intra prediction is to predict the current uncoded blocks with surrounding coded blocks as reference to effectively eliminate redundancy in a spatial domain. The inter prediction is to predict current images by using neighboring coded images to effectively eliminate redundancy in a temporal domain.

The transform is to transform an image from a spatial domain to a transform domain and represent the image using a transform coefficient. Since most images include many flat regions and regions with a pixel value slowly changing, a proper transform process can transform a decentralized distribution of an image in the spatial domain into a relatively centralized distribution in the transform domain. Therefore, correlation in a frequency domain between signals can be removed, and in cooperation with a quantification process, bitstream data can be effectively compressed.

The entropy coding refers to a lossless coding manner, in which a series of element symbols can be transformed into one binary bitstream for transmission or storage. Input element symbols may include quantified transform coefficients, motion vector information, prediction mode information, transform and quantification related syntaxes, etc. The entropy coding can effectively remove redundancy of the video element symbols.

The above descriptions are made with coding as an example. The video decoding is a reverse process of the video coding, that is, the video decoding usually includes entropy decoding, prediction, inverse quantification, inverse transform, and filter etc. The principle of each process is similar to or same as the entropy coding.

In order to make the above objects, features and advantages of the embodiments of the present disclosure clearer and more understandable, the technical solutions of the embodiments of the present disclosure will be further detailed below in combination with the accompanying drawings.

Embodiment 1

FIG. 5 is a flowchart illustrating an image processing method according to an embodiment of the present disclosure. The image processing method may be applied to a coding device or a decoding device. As shown in FIG. 5, the image processing method may include the following steps.

At step S500, a prediction mode of a current block is determined.

At step S510, when it is determined that the prediction mode of the current block satisfies one of the following conditions, it is determined that the current block satisfies transform skip mode conditions: the prediction mode of the current block is an inter prediction mode, and the prediction mode of the current block is a direct mode.

In one or more embodiments of the present disclosure, for the coding device, the current image block is a coded block; for the decoding device, the current image block is a decoded block, which will not be repeated below.

In one or more embodiments of the present disclosure, the ISTS solution may be applied to the inter prediction mode and/or direct mode without being limited to the intra prediction mode and/or IBC mode, so as to extend the application scope of the ISTS solution.

When it is determined that the prediction mode of the current block satisfies one of the above conditions, it is determined that the current block satisfies the transform skip mode conditions, that is, the current block is allowed to be coded in the transform skip mode.

In some examples, the coding device may select a prediction mode of the current block based on RDO principle.

The decoding device may obtain a prediction mode flag in a bitstream by parsing the bitstream of the current block, so as to determine the prediction mode of the current block.

For example, the decoding device may parse a flag for indicating whether the current block is coded in the skip mode (also called a skip mode flag) from the bitstream of the current block and determine whether the current block is coded in the skip mode based on a value of the skip mode flag; if the current block is not coded in the skip mode, the decoding device may parse a flag for indicating whether the current block is coded in a direct mode (also called a direct mode flag) from the bitstream and determine whether the current block is coded in the direct mode based on a value of the direct mode flag; if the current block is not coded in the direct mode, the decoding device may parse a flag for indicating that the current block is coded in the intra prediction mode or the inter prediction mode from the bitstream, and determine that the current block is coded in the intra prediction mode or the inter prediction mode based on a value of the flag.

In an example, when it is determined that the prediction mode of the current block is the inter prediction mode, it is determined that the current block satisfies the transform skip mode conditions.

In another example, when it is determined that the prediction mode of the current block is the direct mode, it is determined that the current block satisfies the transform skip mode conditions.

In another example, when it is determined that the prediction mode of the current block is the inter prediction mode or the direct mode, it is determined that the current block satisfies the transform skip mode conditions.

Thus, in the method flow shown in FIG. 5, by applying the transform skip mode to the inter prediction mode and/or direct mode, the application scope of the ISTS solution can be extended, the coding performance can be improved, and the decoding delay can be reduced.

Embodiment 2

In an example, the current block satisfies the transform skip mode conditions, which further includes the followings:
the current block satisfies one of the following conditions:
the current block is not coded in a PBT mode;
the current block is not coded in an SBT mode; and
the current block is neither coded in the PBT mode nor in the SBT mode; or, the current block is transformed using the DCT2 transform.

In some examples, when the current block is coded in the PBT mode, it is required to perform subblock partition on the current block, and the transforms for the subblocks at different positions are not completely same; when the current block is coded in the SBT mode, it is required to perform subblock partition on the inter residual block, where the residual of one of the subblocks defaults to be 0 and the residual of the other subblock defaults to be non-zero. Thus, when the current block is coded in the PBT mode or SBT mode, the complexity of using the transform skip mode will be very high, and no obvious performance improvement will be brought.

Hence, whether the current block is coded in the PBT mode or SBT mode may also be determined as a condition for determining whether the current block satisfies the transform skip mode conditions.

In some examples, the coding device may select the PBT mode, the SBT mode or the DCT2 transform manner for the current block based on RDO principle.

The decoding device may obtain the value of the transform mode flag in the bitstream by parsing the bitstream of the current block, so as to determine the PBT mode, the SBT mode or the DCT2 transform manner for the current block.

For example, the decoding device may parse a flag for indicating whether the current block is coded in the PBT mode from the bitstream of the current block, and determine whether the current block is coded in the PBT mode based on the value of the flag; if the current block is not coded in the PBT mode, the decoding device may parse a flag for indicating whether the current block is coded in the SBT mode from the bitstream, and determine whether the current block is coded in the SBT mode based on the value of the flag; if the current block is not coded in the SBT mode, the decoding device may determine that the current block is coded in the DCT2 mode.

In an example, when the current block satisfies the conditions in embodiment 1 and is not coded in the PBT mode, it is determined that the current block satisfies the transform skip mode.

In another example, when the current block satisfies the conditions in embodiment 1 and is not coded in the SBT mode, it is determined that the current block satisfies the transform skip mode.

In another example, when the current block satisfies the conditions in embodiment 1 and is coded neither in the PBT mode nor in the SBT mode; or when the current block satisfies the conditions in embodiment 1 and is transformed in the DCT2 transform manner, it is determined that the current block satisfies the transform skip mode.

Embodiment 3

In an example, when the prediction mode of the current block is the direct mode, the current block satisfies the transform skip mode conditions, which further includes the following:
the current block is not coded in an inter prediction filter mode.

In some examples, when the current block is coded in the inter prediction filter mode, the adoption of the transform skip mode for the current block will bring little improvement to the performance of the current block but will increase the complexity.

Hence, when the prediction mode of the current block is the direct mode, whether the current block is coded in the inter prediction filter mode may also be determined as a condition for determining whether the current block satisfies the transform skip mode conditions.

In some examples, the decoding device may parse a bitstream identifier corresponding to a filter manner index of the current block from the bitstream (as shown in Table 3) and determine a filter type of the current block.

The coding device may, based on RDO principle, determine whether the current block is coded in the inter prediction filter mode.

For example, when the bitstream identifier corresponding to the filter manner index and obtained from the bitstream of the current block by parsing is 0, the decoding device may determine the current block is not coded in the inter prediction filter mode; if the bitstream identifier obtained by parsing is 10, the decoding device may determine the current block is coded in the inter prediction filter mode which is also a regular inter prediction filter mode; if the bitstream identifier obtained by parsing is 11, the decoding device may determine the current block is coded in the inter prediction filter mode which is also an enhanced inter prediction filter mode.

In an example, when the prediction mode of the current block is the direct mode and the current block is not coded in the inter prediction filter mode, it is determined that the current block satisfies the transform skip mode.

In another example, when the prediction mode of the current block is the direct mode and the current block is not coded in the inter prediction filter mode and the current block is not coded in the PBT mode, it is determined that the current block satisfies the transform skip mode.

In another example, when the prediction mode of the current block is the direct mode and the current block is not coded in the inter prediction filter mode and the current block is not coded in the SBT mode, it is determined that the current block satisfies the transform skip mode.

In another example, when the prediction mode of the current block is the direct mode and the current block is not coded in the inter prediction filter mode and the current block is not coded in the PBT mode nor in the SBT mode; or when the current block satisfies the conditions in embodiment 1 and is transformed in the DCT2 transform manner, it is determined that the current block satisfies the transform skip mode.

Embodiment 4

In an example, the current block satisfies the transform skip mode conditions, which further includes the followings:
the current block satisfies at least one of the following conditions:
the current block is a luma block; or
a width and a height of the current block both are less than 64.

In some examples, a chroma block of an image usually has a simple texture, and the application of the transform skip mode brings little performance improvement.

Furthermore, for those blocks with the width and the height being large, for example, being greater than 64, the complexity of applying the transform skip mode will be increased more obviously than the performance.

Hence, the current block being a luma block or chroma block and the size of the current block can also be determined as a condition for determining that the current block satisfies the transform skip mode conditions.

In an example, when the current block satisfies the conditions in any one of embodiments 1 to 3 and the current block is a luma block, it is determined that the current block satisfies the transform skip mode.

In another example, when the current block satisfies the conditions in any one of embodiments 1 to 3 and the width and the height of the current block both are less than 64, it is determined that the current block satisfies the transform skip mode.

In another example, when the current block satisfies the conditions in any one of embodiments 1 to 3, and the current block is a luma block and the width and the height of the current block both are less than 64, it is determined that the current block satisfies the transform skip mode.

Embodiment 5

FIG. 6 is a flowchart illustrating an image processing method according to an embodiment of the present disclosure. The image processing method may be applied to a coding device or a decoding device. As shown in FIG. 6, the image processing method may include the following steps.

At step S600, a transform mode of a current block is determined.

At step S610, when it is determined that the transform mode of the current block satisfies one of the following conditions, it is determined that the current block satisfies transform skip mode conditions: the current block is not coded in a PBT mode; the current block is not coded in an SBT mode; and the current block is neither coded in the PBT mode nor in the SBT mode, or the current block is transformed in a DCT2 transform manner.

In one or more embodiments of the present disclosure, when the current block is coded in the PBT mode, it is required to perform subblock partition on the current block, and the transforms for the subblocks at different positions are not completely same; when the current block is coded in the SBT mode, it is required to perform subblock partition on the inter residual block, where the residual of one of the subblocks defaults to be 0 and the residual of the other subblock defaults to be non-zero. Thus, when the current block is coded in the PBT mode or SBT mode, the complexity of using the transform skip mode will be very high, and no obvious performance improvement will be brought.

Hence, whether the current block is coded in the PBT mode or SBT mode may also be determined as a condition for determining whether the current block satisfies the transform skip mode conditions.

In some examples, the coding device may, based on RDO principle, select the PBT mode, the SBT mode or the DCT2 transform manner for the current block.

The decoding device may obtain the value of the transform mode flag from the bitstream by parsing the bitstream of the current block, so as to determine the PBT mode, the SBT mode or the DCT2 transform manner for the current block.

For example, the decoding device may parse a flag for indicating whether the current block is coded in the PBT mode from the bitstream of the current block and determine whether the current block is coded in the PBT mode based on the value of the flag; if the current block is not coded in the PBT mode, the decoding device may parse a flag for indicating whether the current block is coded in the SBT mode from the bitstream and determine whether the current block is coded in the SBT mode based on the value of the flag; if the current block is not coded in the SBT mode, the decoding device may determine the current block is coded in the DCT2 mode.

In an example, when the current block is not coded in the PBT mode, it is determined that the current block satisfies the transform skip mode.

In another example, when the current block is not coded in the SBT mode, it is determined that the current block satisfies the transform skip mode.

In another example, when the current block is neither coded in the PBT mode nor in the SBT mode, or when the current block is transformed in the DCT2 transform manner, it is determined that the current block satisfies the transform skip mode.

Embodiment 6

In an example, the current block satisfies the transform skip mode conditions, which further includes the followings: the prediction mode of the current block satisfies one of the following conditions:

the prediction mode of the current block is an inter prediction mode; and the prediction mode of the current block is a direct mode.

In some examples, the ISTS solution can be applied to the inter prediction mode and/or direct mode without being limited to an intra prediction mode or IBC mode, so as to extend the application scope of the ISTS solution.

Hence, the prediction mode of the current block may also be determined as a condition for determining whether the current block satisfies the transform skip mode conditions.

In some examples, the coding device may select the prediction mode of the current block based on RDO principle.

The decoding device may obtain the value of the prediction mode flag from the bitstream by parsing the bitstream of the current block so as to determine the prediction mode of the current block.

For example, the decoding device may parse a flag for indicating whether the current block is coded in the skip mode (also called a skip mode flag) from the bitstream of the current block and determine whether the current block is coded in the skip mode based on the value of the skip mode flag; if the current block is not coded in the skip mode, the decoding device may parse a flag for indicating whether the current block is coded in a direct mode (also called a direct mode flag) from the bitstream and determine whether the current block is coded in the direct mode based on the value of the direct mode flag; if the current block is not coded in the direct mode, the decoding device may parse a flag for indicating that the current block is coded in the intra prediction mode or the inter prediction mode from the bitstream, and determine that the current block is coded in the intra prediction mode or the inter prediction mode based on the value of the flag.

In an example, when the current block satisfies the conditions in embodiment 5 and the prediction mode is the inter prediction mode, it is determined that the current block satisfies the transform skip mode conditions.

In another example, when the current block satisfies the conditions in embodiment 5 and the prediction mode is the direct mode, it is determined that the current block satisfies the transform skip mode conditions.

In another example, when the current block satisfies the conditions in embodiment 5 and the prediction mode is the inter prediction mode or the direct mode, it is determined that the current block satisfies the transform skip mode conditions.

Embodiment 7

In an example, when the prediction mode of the current block is the direct mode, the current block satisfies the transform skip mode conditions, which further includes the following:

the current block is not coded in the inter prediction filter mode.

In some examples, when the current block is coded in the inter prediction filter mode, the adoption of the transform skip mode for the current block will bring little performance improvement to the current block and the complexity will be increased.

Hence, whether the current block is coded in the inter prediction filter mode is determined as a condition for determining whether the current block satisfies the transform skip mode conditions.

In some examples, the decoding device may parse a bitstream identifier corresponding to a filter manner index of the current block from the bitstream (as shown in Table 3) and determine a filter type of the current block.

The coding device may, based on RDO principle, determine whether the current block is coded in the inter prediction filter mode.

For example, when the bitstream identifier corresponding to the filter manner index and obtained from the bitstream of the current block by parsing is 0, the decoding device may determine the current block is not coded in the inter prediction filter mode; if the bitstream identifier obtained by parsing is 10, the decoding device may determine the current block is coded in the inter prediction filter mode which is also a regular inter prediction filter mode; if the bitstream identifier obtained by parsing is 11, the decoding device may determine the current block is coded in the inter prediction filter mode which is also an enhanced inter prediction filter mode.

In an example, when the current block satisfies the conditions in the embodiment 5 or 6 and the current block is not coded in the inter prediction filter mode, it is determined that the current block satisfies the transform skip mode.

Embodiment 8

In an example, the current block satisfies the transform skip mode conditions, which further includes the followings:
the current block satisfies at least one of the following conditions:
the current block is a luma block; or
the width and the height of the current block both are less than 64.

In some examples, a chroma block of an image usually has a simple texture, and the application of the transform skip mode brings little performance improvement.

Furthermore, for those blocks with the width and the height being large, for example, being greater than 64, the complexity of applying the transform skip mode will be increased more obviously than the performance.

Hence, the current block being a luma block or chroma block and the size of the current block can also be determined as a condition for determining that the current block satisfies the transform skip mode conditions.

In an example, when the current block satisfies the conditions in any one of embodiments 5 to 7 and the current block is a luma block, it is determined that the current block satisfies the transform skip mode.

In another example, when the current block satisfies the conditions in any one of embodiments 5 to 7 and the width and the height of the current block both are less than 64, it is determined that the current block satisfies the transform skip mode.

In another example, when the current block satisfies the conditions in any one of embodiments 5 to 7, and the current block is a luma block and the width and the height of the current block both are less than 64, it is determined that the current block satisfies the transform skip mode.

Embodiment 9

FIG. 7 is a flowchart illustrating an image processing method according to an embodiment of the present disclosure. The image processing method may be applied to a coding device or a decoding device. As shown in FIG. 7, the image processing method may include the following steps.

At step S700, when the current block is not coded in the inter prediction filter mode, it is determined that the current block satisfies the transform skip mode conditions.

In one or more embodiments of the present disclosure, when the current block is coded in the inter prediction filter mode, the adoption of the transform skip mode for the current block will bring little performance improvement to the current block and the complexity will be increased.

Hence, whether the current block is coded in the inter prediction filter mode may also be determined as a condition for determining whether the current block satisfies the transform skip mode conditions.

In some examples, the decoding device may parse a bitstream identifier corresponding to a filter manner index of the current block from the bitstream (as shown in Table 3) and determine a filter type of the current block.

The coding device may, based on RDO principle, determine whether the current block is coded in the inter prediction filter mode.

For example, when the bitstream identifier corresponding to the filter manner index and obtained from the bitstream of the current block by parsing is 0, the decoding device may determine the current block is not coded in the inter prediction filter mode; if the bitstream identifier obtained by parsing is 10, the decoding device may determine the current block is coded in the inter prediction filter mode which is also a regular inter prediction filter mode; if the bitstream identifier obtained by parsing is 11, the decoding device may determine the current block is coded in the inter prediction filter mode which is also an enhanced inter prediction filter mode.

Embodiment 10

In an example, the current block satisfies the transform skip mode conditions, which further includes the followings:
the prediction mode of the current block satisfies one of the following conditions:
the prediction mode of the current block is an inter prediction mode; and
the prediction mode of the current block is a direct mode.

In some examples, the ISTS solution may be applied to the inter prediction mode and/or direct mode without being limited to the intra prediction mode and/or IBC mode, so as to extend the application scope of the ISTS solution.

Therefore, the prediction mode of the current block may also be determined as a condition for determining whether the current block satisfies the transform skip mode conditions.

In some examples, the coding device may select the prediction mode of the current block based on RDO principle.

The decoding device may obtain a prediction mode flag in a bitstream by parsing the bitstream of the current block, so as to determine the prediction mode of the current block.

For example, the decoding device may parse a flag for indicating whether the current block is coded in the skip mode (also called a skip mode flag) from the bitstream of the current block and determine whether the current block is coded in the skip mode based on a value of the skip mode flag; if the current block is not coded in the skip mode, the decoding device may parse a flag for indicating whether the current block is coded in a direct mode (also called a direct mode flag) from the bitstream and determine whether the current block is coded in the direct mode based on a value of the direct mode flag; if the current block is not coded in the direct mode, the decoding device may parse a flag for indicating that the current block is coded in the intra prediction mode or the inter prediction mode from the bitstream, and determine that the current block is coded in the intra prediction mode or the inter prediction mode based on a value of the flag.

In an example, when the current block satisfies the conditions in embodiment 9 and the prediction mode is the inter prediction mode, it is determined that the current block satisfies the transform skip mode conditions.

In another example, when the current block satisfies the conditions in embodiment 9 and the prediction mode is the direct mode, it is determined that the current block satisfies the transform skip mode conditions.

In another example, when the current block satisfies the conditions in embodiment 9 and the prediction mode is the inter prediction mode or the direct mode, it is determined that the current block satisfies the transform skip mode conditions.

Embodiment 11

In an example, the current block satisfies the transform skip mode conditions, which further includes the followings:
the current block satisfies one of the following conditions:
the current block is not coded in the PBT mode;
the current block is not coded in the SBT mode; and
the current block is neither coded in the PBT mode nor in the SBT mode; or, the current block is transformed using the DCT2 transform.

In some examples, when the current block is coded in the PBT mode, it is required to perform subblock partition on the current block, and the transforms for the subblocks at different positions are not completely same; when the current block is coded in the SBT mode, it is required to perform subblock partition on the inter residual block, where the residual of one of the subblocks defaults to be 0 and the residual of the other subblock defaults to be non-zero. Thus, when the current block is coded in the PBT mode or SBT mode, the complexity of using the transform skip mode will be very high, and no obvious performance improvement will be brought.

Hence, whether the current block is coded in the PBT mode or SBT mode may also be determined as a condition for determining whether the current block satisfies the transform skip mode conditions.

In some examples, the coding device may select the PBT mode, the SBT mode or the DCT2 transform manner for the current block based on RDO principle.

The decoding device may obtain the value of the transform mode flag in the bitstream by parsing the bitstream of the current block, so as to determine the PBT mode, the SBT mode or the DCT2 transform manner for the current block.

For example, the decoding device may parse a flag for indicating whether the current block is coded in the PBT mode from the bitstream of the current block, and determine whether the current block is coded in the PBT mode based on the value of the flag; if the current block is not coded in the PBT mode, the decoding device may parse a flag for indicating whether the current block is coded in the SBT mode from the bitstream, and determine whether the current block is coded in the SBT mode based on the value of the flag; if the current block is not coded in the SBT mode, the decoding device may determine that the current block is coded in the DCT2 mode.

In an example, when the current block satisfies the conditions in embodiment 9 or 10 and the current block is not coded in the PBT mode, it is determined that the current block satisfies the transform skip mode.

In another example, when the current block satisfies the conditions in embodiment 9 or 10 and the current block is not coded in the PBT mode; or when the current block satisfies the conditions in embodiment 9 or 10 and the current block is transformed in the DCT2 transform manner, it is determined that the current block satisfies the transform skip mode.

In another example, when the current block satisfies the conditions in embodiment 9 or 10 and the current block is neither coded in the PBT mode nor in the SBT mode, it is determined that the current block satisfies the transform skip mode.

Embodiment 12

In an example, the current block satisfies the transform skip mode conditions, which further includes the followings:
the current block satisfies at least one of the following conditions:
the current block is a luma block; or
a width and a height of the current block both are less than 64.

In some examples, a chroma block of an image usually has a simple texture, and the application of the transform skip mode brings little performance improvement.

Furthermore, for those blocks with the width and the height being large, for example, being greater than 64, the complexity of applying the transform skip mode will be increased more obviously than the performance.

Hence, the current block being a luma block or chroma block and the size of the current block can also be determined as a condition for determining that the current block satisfies the transform skip mode conditions.

In an example, when the current block satisfies the conditions in any one of embodiments 9 to 11 and the current block is a luma block, it is determined that the current block satisfies the transform skip mode.

In another example, when the current block satisfies the conditions in any one of embodiments 9 to 11 and the width and the height of the current block both are less than 64, it is determined that the current block satisfies the transform skip mode.

In another example, when the current block satisfies the conditions in any one of embodiments 9 to 11, and the current block is a luma block and the width and the height of the current block both are less than 64, it is determined that the current block satisfies the transform skip mode.

Embodiment 13

FIG. 8 is a flowchart illustrating a decoding method according to an embodiment of the present disclosure. The decoding method may be applied to a decoding device. As shown in FIG. 8, the decoding method may include the following steps.

At step S800, a bistream is acquired.

At step S810, a value of an inter transform skip mode enable flag is obtained from the bitstream.

In one or more embodiments of the present disclosure, in order to improve the flexibility and controllability of the application of a transform skip mode of an inter prediction mode and/or direct mode, one flag for indicating whether an inter transform skip mode is enabled may be set.

In some examples, the value of the flag may at least include a first value and a second value, where the first value is a value for representing enabling the inter transform skip mode and the second value is a value for representing not enabling the inter transform skip mode.

When the value of the flag is the first value, it represents that the transform skip mode can be applied to the inter prediction mode and/or direct mode.

In an example, the inter transform skip mode enable flag may be implemented by a sequence parameter set (SPS) syntax. For one picture sequence, one inter transform skip mode enable flag indicates whether the picture sequence can apply the transform skip mode to the inter prediction mode and/or direct mode, thereby saving the coded bit consumption.

It should be realized that the inter transform skip mode enable flag is not limited to implementation by the SPS syntax and may also be implemented by a syntax such as a picture parameter set (PPS) syntax or a slice syntax or the like.

With implementation of the inter transform skip mode enable flag by the SPS syntax as an example, a decoding device may parse an inter transform skip mode enable flag from a sequence header of a picture sequence and may, based on a value of the obtained inter transform skip mode enable flag, determine whether the inter transform skip mode is enabled.

At step S820, when the value of the inter transform skip mode enable flag is the first value and the current block satisfies transform skip mode conditions, a transform coefficient of the current block is obtained by performing inverse transform skip process or DCT2 inverse transform process on the current block and a residual coefficient of the current block is obtained by performing inverse quantification on the transform coefficient.

In one or more embodiments of the present disclosure, when the value of the inter transform skip mode enable flag is the first value, namely, when the inter transform skip mode is enabled, the decoding device may determine whether the current block satisfies the transform skip mode conditions.

It should be noted that, when a coding device performs bitstream coding, the coding device may also code a transform skip mode enable flag, where the transform skip mode enable flag is usually implemented by PPS syntax to indicate whether the transform skip mode is enabled for one picture. When the decoding device determines that the value of the inter transform skip mode enable flag is the first value, for any picture, a transform skip mode enable flag may also be parsed from a bitstream of the picture. When the value of the transform skip mode enable flag is a value for representing that the transform skip mode is enabled for the picture, each block of the picture may be determined based on whether the transform skip mode conditions are satisfied.

In some examples, the decoding device may determine whether the current block satisfies the transform skip mode conditions in the way shown in any one of embodiments 1 to 12.

When the decoding device determines that the current block satisfies the transform skip mode conditions, the decoding device may, based on the parity of the number of the non-zero transform coefficients (transform coefficients before inverse quantification) of the current block, determine that the inverse transform skip process or DCT2 inverse transform process is performed on the current block.

In some examples, when the number of the non-zero transform coefficients of the current block is an odd number, it is determined that the inverse transform skip process is performed on the current block.

When the number of the non-zero transform coefficients of the current block is an even number, it is determined that the DCT2 inverse transform process is performed on the current block.

When obtaining the transform coefficient of the current block by performing inverse transform skip process or DCT2 inverse transform process on the current block, the decoding device may obtain a residual coefficient of the current block by performing inverse quantification process.

At step S830, based on a prediction value of the current block and the residual coefficient of the current block, a reconstruction value of the current block is determined.

In one or more embodiments of the present disclosure, the decoding device may determine the reconstruction value of the current block based on the prediction value of the current block obtained by prediction and the residual coefficient of the current block obtained in step S820.

Thus, in the method flow shown in FIG. 8, by adding the inter transform skip mode enable flag, the application of the transform skip mode of the inter prediction mode and/or direct mode can be controlled, thereby improving the flexibility and controllability of the application of the transform skip mode and enhancing the flexibility and controllability of the application of the ISTS solutions. Furthermore, by applying the ISTS solutions to the inter prediction mode and/or direct mode, the application scope of the ISTS solutions is extended, and thus coding performance is improved and the decoding delay is reduced.

Embodiment 14

FIG. 9 is a flowchart illustrating a coding method according to an embodiment of the present disclosure. The coding method may be applied to a coding device. As shown in FIG. 9, the coding method may include the following steps.

At step S900, an inter transform skip mode enable flag is coded.

In one or more embodiments of the present disclosure, in order to improve the flexibility and controllability of the application of a transform skip mode of an inter prediction mode and/or direct mode, one flag for indicating whether an inter transform skip mode is enabled may be set.

In some examples, the value of the flag may at least include a first value and a second value, where the first value is a value for representing enabling the inter transform skip mode and the second value is a value for representing not enabling the inter transform skip mode.

When the value of the flag is the first value, it represents that the transform skip mode can be applied to the inter prediction mode and/or direct mode.

In an example, the inter transform skip mode enable flag may be implemented by a sequence parameter set (SPS) syntax. For one picture sequence, one inter transform skip mode enable flag indicates whether the picture sequence can apply the transform skip mode to the inter prediction mode and/or direct mode, thereby saving the coded bit consumption.

It should be realized that the inter transform skip mode enable flag is not limited to implementation by the SPS syntax and may also be implemented by a syntax such as a picture parameter set (PPS) syntax or a slice syntax or the like.

With implementation of the inter transform skip mode enable flag by the SPS syntax as an example, a coding device may add an inter transform skip mode enable flag to a sequence header of a picture sequence and based on configuration, set a value of the inter transform skip mode enable flag.

At step S910, when the value of the inter transform skip mode enable flag is the first value and the current block satisfies transform skip mode conditions, a transform coefficient of the current block is obtained by performing transform skip process or DCT2 transform process on the current block based on rate distortion cost.

In one or more embodiments of the present disclosure, when the value of the inter transform skip mode enable flag is the first value, namely, when the inter transform skip mode is enabled, the coding device may determine whether the current block satisfies the transform skip mode.

It should be noted that, when the coding device performs bitstream coding, the coding device may also code a transform skip mode enable flag, where the transform skip mode enable flag is usually implemented by PPS syntax to indicate whether the transform skip mode is enabled for one picture. When the value of the transform skip mode enable flag is a value for representing the transform skip mode is enabled for the picture, the coding device may determine each block of the picture based on whether the transform skip mode conditions are satisfied.

In some examples, the coding device may determine whether the current block satisfies the transform skip mode conditions in the way shown in any one of embodiments 1 to 12.

When the coding device determines that the current block satisfies the transform skip mode conditions, the coding device may, based on RDO principle, determine that the transform skip process or DCT2 transform process is performed on the current block.

At step S920, when the parity of the number of the non-zero transform coefficients of the current block does not match the selected transform manner, the parity of the number the non-zero transform coefficients of the current block is adjusted to enable the parity of the number of the non-zero transform coefficients of the current block to match the selected transform manner.

In one or more embodiments of the present disclosure, in order to save coded bit overhead, the current block may be coded in the transform skip process or DCT2 transform process based on the ISTS solution.

In some examples, when the coding device selects to perform transform skip process on the current block, it is required to enable the number of the non-zero transform coefficients of the current block (transform coefficients before quantification) to be an odd number; when the coding device selects to perform DCT2 process on the current block, it is required to enable the number of the non-zero transform coefficients of the current block to be an even number.

When selecting to perform transform skip process or DCT2 transform process on the current block based on RDO principle, the coding device may determine whether the parity of the number of the non-zero transform coefficients of the current block matches the selected transform manner (the transform skip mode or DCT2 transform).

When the parity of the number of the non-zero transform coefficients of the current block does not match the selected transform manner, the coding device may adjust the parity of the number of the non-zero transform coefficients of the current block to enable the parity of the number of the non-zero transform coefficients of the current block to match the selected transform manner.

For example, when the coding device selects to perform transform skip process on the current block and the number of the non-zero transform coefficients of the current block is an even number, the coding device may set the last non-zero transform coefficient of the current block to zero so as to enable the number of the non-zero transform coefficients of the current block to be an odd number.

When the coding device selects to perform DCT 2 transform process on the current block and the number of the non-zero transform coefficients of the current block is an odd number, the coding device may set the last non-zero transform coefficient of the current block to zero so as to enable the number of the non-zero transform coefficients of the current block to be an even number.

At step S930, a bitstream of the current block is obtained by performing quantification and entropy coding on the transform coefficient of the current block.

In one or more embodiments of the present disclosure, when the parity of the number of the non-zero transform coefficients of the current block matches the selected transform manner, the coding device may obtain the bitstream of the current block by performing quantification and entropy coding on the transform coefficient of the current block.

Thus, in the method flow shown in FIG. 9, by adding the inter transform skip mode enable flag, the application of the transform skip mode of the inter prediction mode and/or direct mode can be controlled, thereby improving the flexibility and controllability of the application of the transform skip mode and enhancing the flexibility and controllability of the application of the ISTS solutions. Furthermore, by applying the ISTS solutions to the inter prediction mode and/or direct mode, the application scope of the ISTS solutions is extended, and thus coding performance is improved and the decoding delay is reduced.

In order to help those skilled in the art to better understand the technical solutions of embodiments of the present disclosure, the technical solutions of the embodiments of the present disclosure will be further described in details in combination with the specific embodiments.

Embodiment 15

Application of the ISTS to the inter prediction mode and/or direct mode

The current block satisfies the transform skip mode conditions, including the followings:

The prediction mode of the current block satisfies one of the following conditions:

1. the prediction mode of the current block is the inter prediction mode;

2. the prediction mode of the current block is the direct mode; and 3. the prediction mode of the current block is the inter prediction mode or direct mode.

Embodiment 16

Application of the ISTS to transform modes other than the PBT mode and/or SBT mode The current block satisfies the transform skip mode conditions, including the followings:

the transform mode of the current block satisfies one of the following conditions:

1. the current block is not coded in the PBT mode;

2. the current block is not coded in the SBT mode; and 3. the current block is neither coded in the PBT mode nor in the SBT mode; or the current block is transformed in the DCT2 transform manner.

Embodiment 17

Application of the ISTS to modes other than the inter prediction filter mode

The current block satisfies the transform skip mode conditions, including the followings:

the current block is not coded in the inter prediction filter mode.

Embodiment 18

The current block satisfies the transform skip mode conditions, including the followings:
1. The prediction mode of the current block satisfies one of the following conditions:
1) the prediction mode of the current block is the inter prediction mode;
2) the prediction mode of the current block is the direct mode; and
3) the prediction mode of the current block is the inter prediction mode or direct mode.
2. The transform mode of the current block satisfies one of the following conditions:
1) the current block is not coded in the PBT mode;
2) the current block is not coded in the SBT mode; and
3) the current block is neither coded in the PBT mode nor in the SBT mode; or, when the current block is transformed in the DCT2 transform manner.

Embodiment 19

The current block satisfies the transform skip mode conditions, including the followings:
1. The prediction mode of the current block satisfies one of the following conditions:
1) the prediction mode of the current block is the inter prediction mode;
2) the prediction mode of the current block is the direct mode; and
3) the prediction mode of the current block is the inter prediction mode or direct mode.
2. The current block is not coded in the inter prediction filter mode.

Embodiment 20

The current block satisfies the transform skip mode conditions, including the followings:
1. The transform mode of the current block satisfies one of the following conditions:
1) the current block is not coded in the PBT mode;
2) the current block is not coded in the SBT mode; and
3) the current block is neither coded in the PBT mode nor in the SBT mode; or, when the current block is transformed in the DCT2 transform manner.
2. The current block is not coded in the inter prediction filter mode.

Embodiment 21

The current block satisfies the transform skip mode conditions, including the followings:

1. The prediction mode of the current block satisfies one of the following conditions:
1) the prediction mode of the current block is the inter prediction mode;
2) the prediction mode of the current block is the direct mode; and
3) the prediction mode of the current block is the inter prediction mode or direct mode.
2. The transform mode of the current block satisfies one of the following conditions:
1) the current block is not coded in the PBT mode;
2) the current block is not coded in the SBT mode; and
3) the current block is neither coded in the PBT mode nor in the SBT mode; or, when the current block is transformed in the DCT2 transform manner.
3. The current block is not coded in the inter prediction filter mode.

Embodiment 22

The current block satisfies the transform skip mode conditions, including the followings:
1. The prediction mode of the current block satisfies one of the following conditions:
1) the prediction mode of the current block is the inter prediction mode;
2) the prediction mode of the current block is the direct mode; and
3) the prediction mode of the current block is the inter prediction mode or direct mode.
2. The current block satisfies at least one of the following conditions:
1) the current block is a luma block; or
2) a width and a height of the current block both are less than 64.

Embodiment 23

The current block satisfies the transform skip mode conditions, including the followings:
1. The transform mode of the current block satisfies one of the following conditions:
1) the current block is not coded in the PBT mode;
2) the current block is not coded in the SBT mode; and
3) the current block is neither coded in the PBT mode nor in the SBT mode; or, when the current block is transformed in the DCT2 transform manner.
2. The current block satisfies at least one of the following conditions:
1) the current block is a luma block; or
2) a width and a height of the current block both are less than 64.

Embodiment 24

The current block satisfies the transform skip mode conditions, including the followings:
1. The current block is not coded in the inter prediction filter mode.
2. The current block satisfies at least one of the following conditions:
1) the current block is a luma block; or
2) a width and a height of the current block both are less than 64.

Embodiment 25

The current block satisfies the transform skip mode conditions, including the followings:

1. The prediction mode of the current block satisfies one of the following conditions:
1) the prediction mode of the current block is the inter prediction mode;
2) the prediction mode of the current block is the direct mode; and
3) the prediction mode of the current block is the inter prediction mode or direct mode.
2. The transform mode of the current block satisfies one of the following conditions:
1) the current block is not coded in the PBT mode;
2) the current block is not coded in the SBT mode; and
3) the current block is neither coded in the PBT mode nor in the SBT mode; or, when the current block is transformed in the DCT2 transform manner.
3. The current block satisfies at least one of the following conditions:
1) the current block is a luma block; or
2) a width and a height of the current block both are less than 64.

Embodiment 26

The current block satisfies the transform skip mode conditions, including the followings:
1. The prediction mode of the current block satisfies one of the following conditions:
1) the prediction mode of the current block is the inter prediction mode;
2) the prediction mode of the current block is the direct mode; and
3) the prediction mode of the current block is the inter prediction mode or direct mode.
2. The current block is not coded in the inter prediction filter mode.
3. The current block satisfies at least one of the following conditions:
1) the current block is a luma block; or
2) a width and a height of the current block both are less than 64.

Embodiment 27

The current block satisfies the transform skip mode conditions, including the followings:
1. The transform mode of the current block satisfies one of the following conditions:
1) the current block is not coded in the PBT mode;
2) the current block is not coded in the SBT mode; and
3) the current block is neither coded in the PBT mode nor in the SBT mode; or, when the current block is transformed in the DCT2 transform manner.
2. The current block is not coded in the inter prediction filter mode.
3. The current block satisfies at least one of the following conditions:
1) the current block is a luma block; or
2) a width and a height of the current block both are less than 64.

Embodiment 28

The current block satisfies the transform skip mode conditions, including the followings:
1. The prediction mode of the current block satisfies one of the following conditions:

1) the prediction mode of the current block is the inter prediction mode;
2) the prediction mode of the current block is the direct mode; and
3) the prediction mode of the current block is the inter prediction mode or direct mode.
2. The transform mode of the current block satisfies one of the following conditions:
1) the current block is not coded in the PBT mode;
2) the current block is not coded in the SBT mode; and
3) the current block is neither coded in the PBT mode nor in the SBT mode; or, when the current block is transformed in the DCT2 transform manner.
3. The current block is not coded in the inter prediction filter mode.
4. The current block satisfies at least one of the following conditions:
1) the current block is a luma block; or
2) a width and a height of the current block both are less than 64.

Embodiment 29

Decoding Flow
A bitstream is received.
An inter transform skip mode enable flag inter_ists_enable_flag is obtained from the bitstream. If the inter_ists_enable_flag is true (for example, the value is 1) and the current block satisfies the transform skip mode conditions, whether the transform skip process is performed on the current block is determined based on the parity of the number (num_nz) of the non-zero transform coefficients (the transform coefficients are transform coefficients before inverse quantification) of the current block.
If the num_nz is an odd number, the inverse transform skip process is performed on the current block; if the num_nz is an even number, the DCT2 inverse transform is performed on the current block, so as to obtain a transform coefficient of the current block (the transform coefficient before inverse quantification).
A reconstruction value of the current block is obtained by adding a residual coefficient of the current block obtained by inverse quantification to a prediction value of the current block.
In some examples, the decoding device may determine the current block satisfies the transform skip mode conditions in the way shown in any one of embodiments 15 to 28.

Embodiment 30

Coding Flow
An inter transform skip mode enable flag inter_ists_enable_flag is coded.
If inter_ists_enable_flag is true (for example, the value is 1) and the current block satisfies the transform skip mode conditions, the transform skip process or DCT2 transform process is performed on the current block based on RDO.
In some examples, the transform skip mode is identified by an implicit method, that is, by adjusting the parity of the number (num_nz) of the non-zero transform coefficients of the current block (the transform coefficients are quantified transform coefficients), the parity of the number of the non-zero transform coefficients of the current block is matched with the transform manner of the current block.
In some examples, if the transform skip process is performed on the current block, the number num_nz of the current block is required to be an odd number; if it is not an odd number, the non-zero transform coefficients are adjusted to enable the number num_nz to be an odd number. Likewise, if the DCT2 transform process is performed on the current block, the number num_nz of the current block is required to be an even number; if it is not an even number, the non-zero transform coefficients are adjusted to enable the number num_nz to be an even number.

A bitstream of the current block is obtained by performing quantification and entropy coding on the transform coefficient of the current block.

In some examples, the coding device may determine that the current block satisfies the transform skip mode conditions in the way shown in any one of embodiments 15 to 28.

The methods of the present disclosure are described as above and the apparatuses of the present disclosure will be described below.

FIG. 10 is a schematic diagram illustrating a hardware structure of a decoding apparatus according to an embodiment of the present disclosure. The decoding apparatus may include a processor 1001, a communication interface 1002, and a machine readable storage medium 1003 storing machine-executable instructions. The processor 1001, the communication interface 1002 and the machine readable storage medium 1003 may communicate with each other via a system bus 1004. Furthermore, by reading and executing machine executable instructions corresponding to decoding control logic and stored in the machine readable storage medium 1003, the processor 1001 is caused to perform the above decoding methods.

The machine readable storage medium 1003 mentioned herein may be any of electronic, magnetic, optical or other physical storage devices and may contain or store information such as executable instructions, data and so on. For example, the machine readable storage medium may be a Radom Access Memory (RAM), a volatile memory, a non-volatile memory, a flash memory, a storage drive (e.g. hard disk drive), a solid state harddisk, any type of storage disk (e.g., compact disk, Digital Video Disk (DVD)), or a similar storage medium, or a combination thereof.

Figure 11:
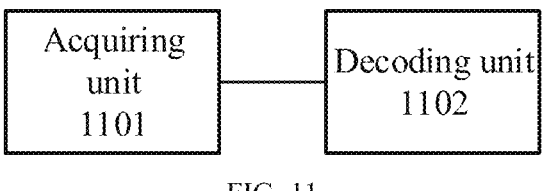
FIG. 11 is a schematic diagram illustrating a functional structure of a decoding apparatus according to an embodi-ment of the present disclosure.

As shown in FIG. 11, the above decoding apparatus may functionally include:

an acquiring unit 1101, configured to acquire a bitstream;

a decoding unit 1102, configured to, when a value of an inter transform skip mode enable flag is a first value and a current block satisfies transform skip mode conditions, based on parity of the number of non-zero transform coefficients of the current block, perform inverse transform skip process or discrete cosine transform (DCT)2 inverse transform process on the current block, and obtain a residual coefficient of the current block by performing inverse quantification, where the first value is a value for representing that an inter transform skip mode is enabled; and based on a prediction value of the current block and the residual coefficient of the current block, determine a reconstruction value of the current block.

Figure 12:
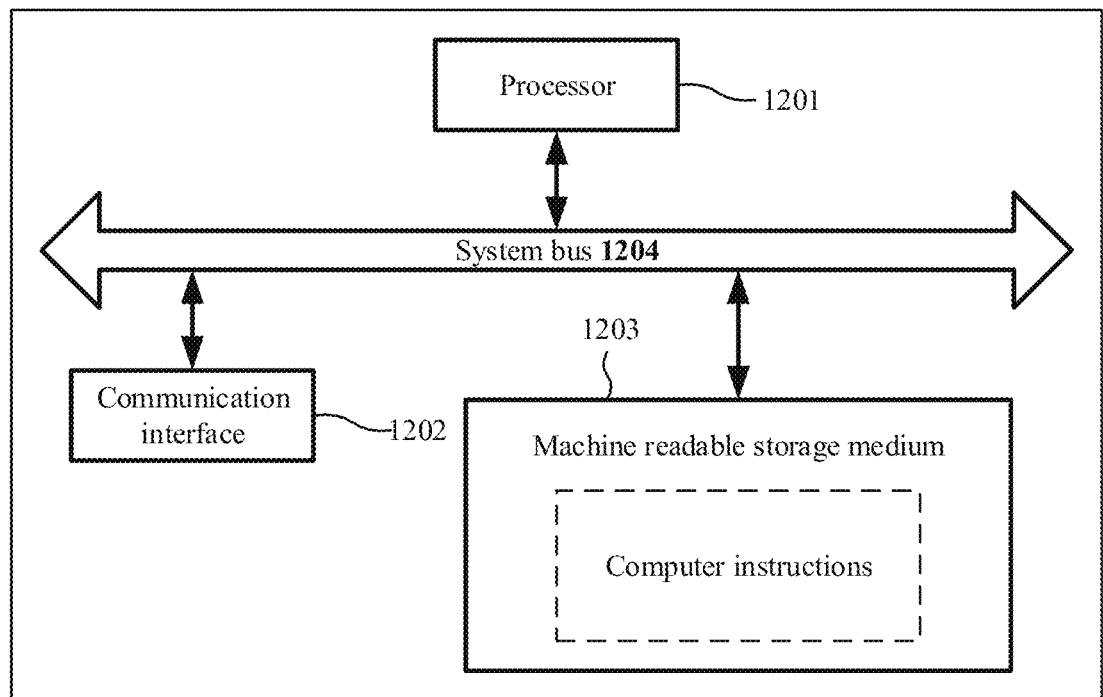
FIG. 12 is a schematic diagram illustrating a hardware structure of a coding apparatus according to an embodiment of the present disclosure.

FIG. 12 is a schematic diagram illustrating a hardware structure of a coding apparatus according to an embodiment of the present disclosure. The coding apparatus may include a processor 1201, a communication interface 1202, and a machine readable storage medium 1203 storing machine executable instructions. The processor 1201, the communication interface 1202 and the machine readable storage medium 1203 may communicate with each other via a system bus 1204. Furthermore, by reading and executing machine executable instructions corresponding to coding control logic and stored in the machine readable storage medium 1203, the processor 1201 is caused to perform the above coding methods.

Figure 13:
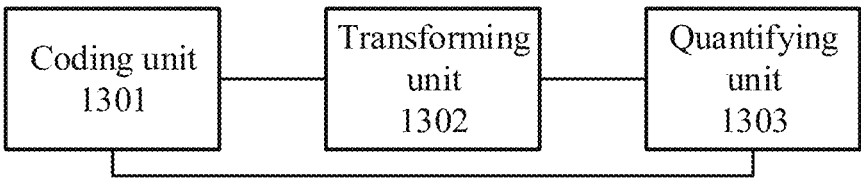
FIG. 13 is a schematic diagram illustrating a functional structure of a coding apparatus according to an embodiment of the present disclosure.

As shown in FIG. 13, the above coding apparatus may functionally include:

a coding unit 1301, configured to code an inter transform skip mode enable flag;

a transforming unit 1302, configured to, when a value of the inter transform skip mode enable flag is a first value, and a current block satisfies transform skip mode conditions, based on rate distortion cost, obtain a transform coefficient of the current block by performing transform skip process or discrete cosine transform (DCT)2 transform process on the current block; when parity of the number of non-zero transform coefficients of the current block does not match a selected transform manner, adjust the parity of the number of the non-zero transform coefficients of the current block to enable the parity of the number of the non-zero transform coefficients of the current block to match the selected transform manner;

a quantifying unit 1303, configured to perform quantification on the transform coefficient of the current block;

where the coding unit is further configured to obtain a bitstream of the current block by performing entropy coding on the quantified transform coefficient of the current block.

The machine readable storage medium 1203 mentioned herein may be any of electronic, magnetic, optical or other physical storage devices and may contain or store information such as executable instructions, data and so on. For example, the machine readable storage medium may be a Radom Access Memory (RAM), a volatile memory, a non-volatile memory, a flash memory, a storage drive (e.g. hard disk drive), a solid state harddisk, any type of storage disk (e.g., compact disk, Digital Video Disk (DVD)), or a similar storage medium, or a combination thereof.

According to an embodiment of the present disclosure, there is further provided a decoding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the transform skip mode conditions are satisfied, obtain a residual coefficient of the current by performing inverse transform skip process or DCT2 inverse transform process on the current block; and obtain a reconstruction value of the current block by adding the residual coefficient of the current block to a prediction value of the current block;

where determining the current block satisfies the transform skip mode conditions includes the followings: a prediction mode of the current block is an inter prediction mode, the current block is a luma block, and a width and a height of the current block both are less than 64.

According to an embodiment of the present disclosure, there is further provided a decoding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; and obtain a reconstruction value of the current block by adding the residual coefficient of the current block to a prediction value of the current block;

where determining the current block satisfies the transform skip mode conditions includes the followings:

a prediction mode of the current block is a direct mode, the current block is a luma block, and a width and a height of the current block both are less than 64.

According to an embodiment of the present disclosure, there is further provided a decoding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; and obtain a reconstruction value of the current block by adding the residual coefficient of the current block to a prediction value of the current block;

where determining the current block satisfies the transform skip mode conditions includes the followings:

a prediction mode of the current block is a direct mode, the current block is not coded in an inter prediction filter mode, the current block is a luma block, and a width and a height of the current block both are less than 64.

According to an embodiment of the present disclosure, there is further provided a decoding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; and obtain a reconstruction value of the current block by adding the residual coefficient of the current block to a prediction value of the current block;

where determining the current block satisfies the transform skip mode conditions includes the followings: a prediction mode of the current block is an inter prediction mode.

According to an embodiment of the present disclosure, there is further provided a decoding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; and obtain a reconstruction value of the current block by adding the residual coefficient of the current block to a prediction value of the current block;

where determining the current block satisfies the transform skip mode conditions includes the followings: a prediction mode of the current block is a direct mode.

According to an embodiment of the present disclosure, there is further provided a decoding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the transform skip mode conditions are satisfied, obtain a residual coefficient of the current block by performing inverse transform skip process or DCT2 inverse transform process on the current block; and obtain a reconstruction value of the current block by adding the residual coefficient of the current block to a prediction value of the current block:

where determining the current block satisfies the transform skip mode conditions includes the followings:

a prediction mode of the current block is a direct mode, and the current block is not coded in an inter prediction filter mode.

According to an embodiment of the present disclosure, there is further provided a coding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the current block satisfies the transform skip mode conditions, based on RDO, obtain a transform coefficient of the current block by performing transform skip process or DCT2 transform process on the current block, and obtain a bitstream of the current block by performing quantification and entropy coding on the transform coefficient of the current block;

where determining the current block satisfies the transform skip mode conditions includes the followings: a prediction mode of the current block is an inter prediction mode, the current block is a luma block, and a width and a height of the current block both are less than 64.

According to an embodiment of the present disclosure, there is further provided a coding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the current block satisfies the transform skip mode conditions, based on RDO, perform transform skip process or DCT2 transform process on the current block, and obtain a bitstream of the current block by performing quantification and entropy coding on the transform coefficient of the current block;

where determining the current block satisfies the transform skip mode conditions includes the followings: a prediction mode of the current block is a direct mode, the current block is a luma block, and a width and a height of the current block both are less than 64.

According to an embodiment of the present disclosure, there is further provided a coding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the current block satisfies the transform skip mode conditions, based on RDO, obtain a transform coefficient of the current block by performing transform skip process or DCT2 transform process on the current block, and obtain a bitstream of the current block by performing quantification and entropy coding on the transform coefficient of the current block;

where determining the current block satisfies the transform skip mode conditions includes the followings: a prediction mode of the current block is a direct mode, the current block is not coded in an inter prediction filter mode, the current block is a luma block, and a width and a height of the current block both are less than 64.

According to an embodiment of the present disclosure, there is further provided a coding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the current block satisfies the transform skip mode conditions, based on RDO, obtain a transform coefficient of the current block by performing transform skip process or DCT2 transform process on the current block, and obtain a bitstream of the current block by performing quantification and entropy coding on the transform coefficient of the current block;

where determining the current block satisfies the transform skip mode conditions includes the followings: a prediction mode of the current block is an inter prediction mode.

According to an embodiment of the present disclosure, there is further provided a coding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the current block satisfies the transform skip mode conditions, based on RDO, obtain a transform coefficient of the current block by performing transform skip process or DCT2 transform process on the current block, and obtain a bitstream of the current block by performing quantification and entropy coding on the transform coefficient of the current block;

where determining the current block satisfies the transform skip mode conditions includes the followings: a prediction mode of the current block is a direct mode.

According to an embodiment of the present disclosure, there is further provided a coding apparatus, including a processor, a communication interface, a machine readable storage medium and a communication bus, where the processor, the communication interface and the machine readable storage medium may communicate with each other via the communication bus; the machine readable storage medium stores a computer program which is executed by the processor to:

determine whether a current block satisfies transform skip mode conditions; if the current block satisfies the transform skip mode conditions, based on RDO, obtain a transform coefficient of the current block by performing transform skip process or DCT2 transform process on the current block, and obtain a bitstream of the current block by performing quantification and entropy coding on the transform coefficient of the current block;

where determining the current block satisfies the transform skip mode conditions includes the followings: a prediction mode of the current block is a direct mode, and the current block is not coded in an inter prediction filter mode.

What is claimed is:

1. A decoding method, comprising:

determining whether a current block satisfies transform skip mode conditions;

if the transform skip mode conditions are satisfied, obtaining a residual coefficient of the current block by performing inverse transform skip process or DCT2 inverse transform process on the current block based on parity of a number of non-zero transform coefficients of the current block; and obtaining a reconstruction value of the current block by adding the residual coefficient of the current block to a prediction value of the current block;

wherein determining whether the current block satisfies the transform skip mode conditions comprises:

in response to a prediction mode of the current block being a direct mode, the current block being a luma block, and a width and a height of the current block both being less than 64, determining the current block satisfies the transform skip mode conditions; or in response to a prediction mode of the current block being a direct mode, the current block not being coded in an inter prediction filter mode, the current block being a luma block, and a width and a height of the current block both being less than 64, determining the current block satisfies the transform skip mode conditions; or in response to a prediction mode of the current block being a direct mode, determining the current block satisfies the transform skip mode conditions; or in response to a prediction mode of the current block being a direct mode, and the current block not being coded in an inter prediction filter mode, determining the current block satisfies the transform skip mode conditions;

wherein the inter prediction filter mode is a filter technology applied under the direct mode, wherein the direct mode refers to a prediction mode in which a coding device is to transmit residual information to a decoding device, but is not to transmit a motion vector difference (MVD), but is to transmit a motion information index; and wherein performing the inverse transform skip process on the current block comprises: performing shift operation on a transform coefficient matrix of the current block.

2. A coding method, comprising:

determining whether a current block satisfies transform skip mode conditions;

if the current block satisfies the transform skip mode conditions, obtaining a transform coefficient of the current block by performing transform skip process or DCT2 transform process on the current block based on rate distortion optimization (RDO), and indicating to perform the transform skip process or the DCT2 transform process on the current block by using parity of a number of non-zero transform coefficients of the current block; and obtaining a bitstream of the current block by performing quantification and entropy coding on the transform coefficient of the current block;

wherein determining whether the current block satisfies the transform skip mode conditions comprises:

in response to a prediction mode of the current block being a direct mode, the current block being a luma block, and a width and a height of the current block both being less than 64, determining the current block satisfies the transform skip mode conditions; or in response to a prediction mode of the current block being a direct mode, the current block not being coded in an inter prediction filter mode, the current block being a luma block, and a width and a height of the current block both being less than 64, determining the current block satisfies the transform skip mode conditions; or in response to a prediction mode of the current block being a direct mode, determining the current block satisfies the transform skip mode conditions, or in response to a prediction mode of the current block being a direct mode, and the current block not being coded in an inter prediction filter mode, determining the current block satisfies the transform skip mode conditions;

wherein the inter prediction filter mode is a filter technology applied under the direct mode, wherein the direct mode refers to a prediction mode in which a coding device is to transmit residual information to a decoding device, but is not to transmit a motion vector difference (MVD), but is to transmit a motion information index; and wherein performing the inverse transform skip process on the current block comprises: performing shift operation on a transform coefficient matrix of the current block.

3. A decoding apparatus, comprising:

at least one processor, a communication interface, at least one machine readable storage medium, and a communication bus, wherein the at least one processor, the communication interface, and the at least one machine readable storage medium communicate with each other via the communication bus; the at least one machine readable storage medium stores a computer program, and the at least one processor is configured to execute the computer program to:

determine whether a current block satisfies transform skip mode conditions;

if the transform skip mode conditions are satisfied, obtain a residual coefficient of the current block by performing inverse transform skip process or DCT2 inverse transform process on the current block based on parity of a number of non-zero transform coefficients of the current block; and obtain a reconstruction value of the current block by adding the residual coefficient of the current block to a prediction value of the current block;

wherein when determining whether the current block satisfies the transform skip mode conditions comprises, the at least one processor is configured to execute the computer program to:

in response to a prediction mode of the current block being a direct mode, the current block being a luma block, and a width and a height of the current block both being less than 64, determine the current block satisfies the transform skip mode conditions; or in response to a prediction mode of the current block being a direct mode, the current block not being coded in an inter prediction filter mode, the current block being a luma block, and a width and a height of the current block both being less than 64, determine the current block satisfies the transform skip mode conditions; or in response to a prediction mode of the current block being a direct mode, determine the current block satisfies the transform skip mode conditions; or in response to a prediction mode of the current block being a direct mode, and the current block not being coded in an inter prediction filter mode, determine the current block satisfies the transform skip mode conditions;

wherein the inter prediction filter mode is a filter technology applied under the direct mode, wherein the direct mode refers to a prediction mode in which a coding device is to transmit residual information to a decoding device, but is not to transmit a motion vector difference (MVD), but is to transmit a motion information index; and wherein performing the inverse transform skip process on the current block comprises: performing shift operation on a transform coefficient matrix of the current block.

4. A coding apparatus, comprising: at least one processor, a communication interface, at least one machine readable storage medium and a communication bus, wherein the at least one processor, the communication interface, and the at least one machine readable storage medium communicate with each other via the communication bus; the at least one machine readable storage medium stores a computer program, and the computer program is executed by the at least one processor to perform the coding method according to claim 2.

5. A non-transitory machine readable storage medium, storing a computer instruction thereon, wherein the computer instruction is executed by at least one processor to perform the method of claim 1.

6. A non-transitory machine readable storage medium, storing a computer instruction thereon, wherein the computer instruction is executed by at least one processor to perform the method of claim 2.

* * * * *